(12) United States Patent
Khalil et al.

(10) Patent No.: US 9,529,985 B2
(45) Date of Patent: Dec. 27, 2016

(54) GLOBAL AUTHENTICATION SERVICE USING A GLOBAL USER IDENTIFIER

(71) Applicant: Verizon Patent and Licensing Inc., Arlington, VA (US)

(72) Inventors: Manah M. Khalil, Coppell, TX (US); Vidhyaprakash Ramachandran, Richardson, TX (US); Vijay Vasu, Plano, TX (US); Saikumar Dubagunta, Plano, TX (US); Sugandha Venkatachalam, Plano, TX (US); Jeffrey R. Wise, Wylie, TX (US); Michael R. Lamison, Tampa, FL (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 142 days.

(21) Appl. No.: 14/278,710

(22) Filed: May 15, 2014

(65) Prior Publication Data

US 2015/0334108 A1   Nov. 19, 2015

(51) Int. Cl.
*G06F 7/04* (2006.01)
*G06F 21/31* (2013.01)
*H04L 29/06* (2006.01)
*H04W 12/06* (2009.01)

(52) U.S. Cl.
CPC .............. *G06F 21/31* (2013.01); *H04L 29/06* (2013.01); *H04L 63/0815* (2013.01); *H04L 63/0884* (2013.01); *H04L 63/10* (2013.01); *H04L 63/102* (2013.01); *H04W 12/06* (2013.01)

(58) Field of Classification Search
CPC .... H04L 63/0815; H04L 63/10; H04L 63/102; H04L 63/18; H04L 63/0853; H04L 9/3263; G06F 21/31; G06F 21/34; G06F 8/30; H04W 12/06; G06Q 20/3274
USPC ........................................................ 726/5–10
See application file for complete search history.

(56) References Cited

U.S. PATENT DOCUMENTS

| | | | |
|---|---|---|---|
| 8,256,664 B1 * | 9/2012 | Balfanz ................... | H04L 63/08 235/375 |
| 2011/0107405 A1 * | 5/2011 | Kisters ..................... | G06F 21/32 726/5 |
| 2011/0219427 A1 * | 9/2011 | Hito ......................... | G06F 21/00 726/3 |

(Continued)

OTHER PUBLICATIONS

Ensygnia, "Secure mobile payment service solution supplier One scan Onescan", http://www.ensygnia.com/, Jul. 15, 2005, 4 pages.

*Primary Examiner* — Nirav B Patel

(57) ABSTRACT

An authentication device may provide an authentication code to a third party device. The third party device may provide a third party service to which a client device has requested access. The authentication device may receive the authentication code from a mobile device that is different from the client device. The authentication device may determine a third party device identifier included in the authentication code. The third party device identifier may identify the third party device that provides the third party service. The authentication device may determine a transaction identifier included in the authentication code. The authentication device may selectively provide the transaction identifier to the third party device, identified by the third party device identifier, to cause the third party device to selectively permit the client device to access the third party service.

20 Claims, 21 Drawing Sheets

(56) References Cited

U.S. PATENT DOCUMENTS

| | | | |
|---|---|---|---|
| 2012/0166309 A1* | 6/2012 | Hwang | G06Q 30/0613 705/26.41 |
| 2012/0240204 A1* | 9/2012 | Bhatnagar | G06F 21/35 726/5 |
| 2013/0167208 A1* | 6/2013 | Shi | H04L 63/18 726/5 |
| 2013/0219479 A1* | 8/2013 | DeSoto | H04W 12/06 726/6 |
| 2014/0282961 A1* | 9/2014 | Dorfman | H04L 63/0823 726/7 |
| 2014/0282991 A1* | 9/2014 | Watanabe | G06F 21/34 726/9 |
| 2014/0298293 A1* | 10/2014 | Nishio | G06F 8/30 717/121 |
| 2015/0089613 A1* | 3/2015 | Tippett | H04L 63/0853 726/7 |
| 2015/0248664 A1* | 9/2015 | Makhdumi | G06Q 20/3274 235/380 |
| 2015/0249540 A1* | 9/2015 | Khalil | H04L 9/3263 713/158 |

* cited by examiner

GLOBAL AUTHENTICATION SERVICE USING A GLOBAL USER IDENTIFIER

BACKGROUND

Passwords may be used for user authentication to prove an identity and/or to gain access to a protected resource. For example, a username and password may be used by a user during a login process that controls access to protected computing devices, operating systems, applications (e.g., email, web sites, etc.), databases, networks, etc.

DETAILED DESCRIPTION OF PREFERRED EMBODIMENTS

The following detailed description of example implementations refers to the accompanying drawings. The same reference numbers in different drawings may identify the same or similar elements.

User authentication may be achieved by requiring a user to enter a username and/or a password in order for the user's identity to be verified. However, requiring a username and password for user authentication may be inefficient. For example, the user may use a single username or password for multiple services, which may cause security issues if there is a security breach in one of the services. Alternatively, the user may use different usernames or passwords for different services, which may cause the user to forget a username or password. Also, usernames and passwords may be hacked, stolen, forgotten, misplaced, etc. Implementations described herein may reduce user reliance on usernames and passwords by providing a mechanism to authenticate a user via a mobile device.

Figure 1A:
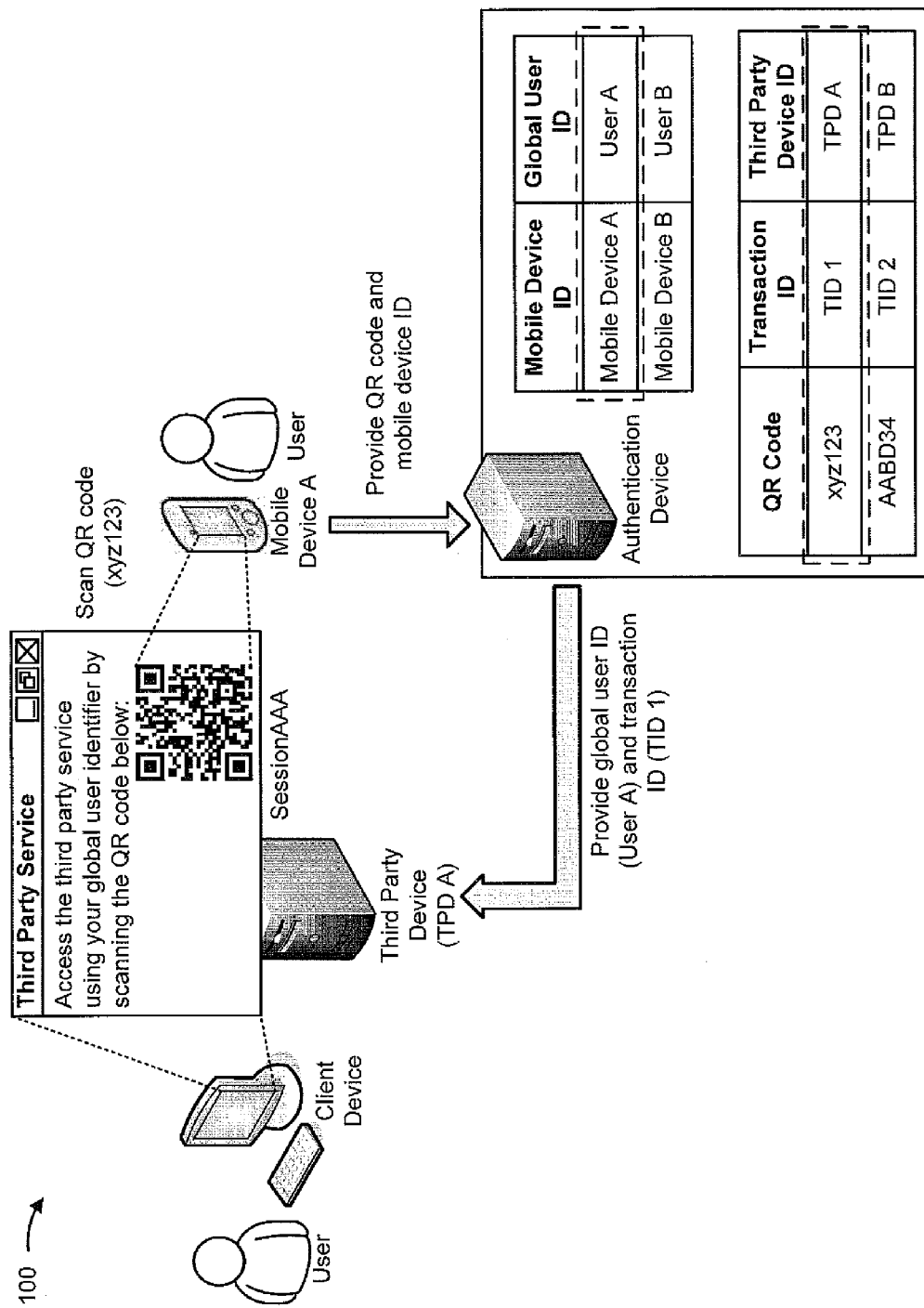
FIGS. 1A and 1B are diagrams of an overview of an example implementation described herein.
Figure 1B:
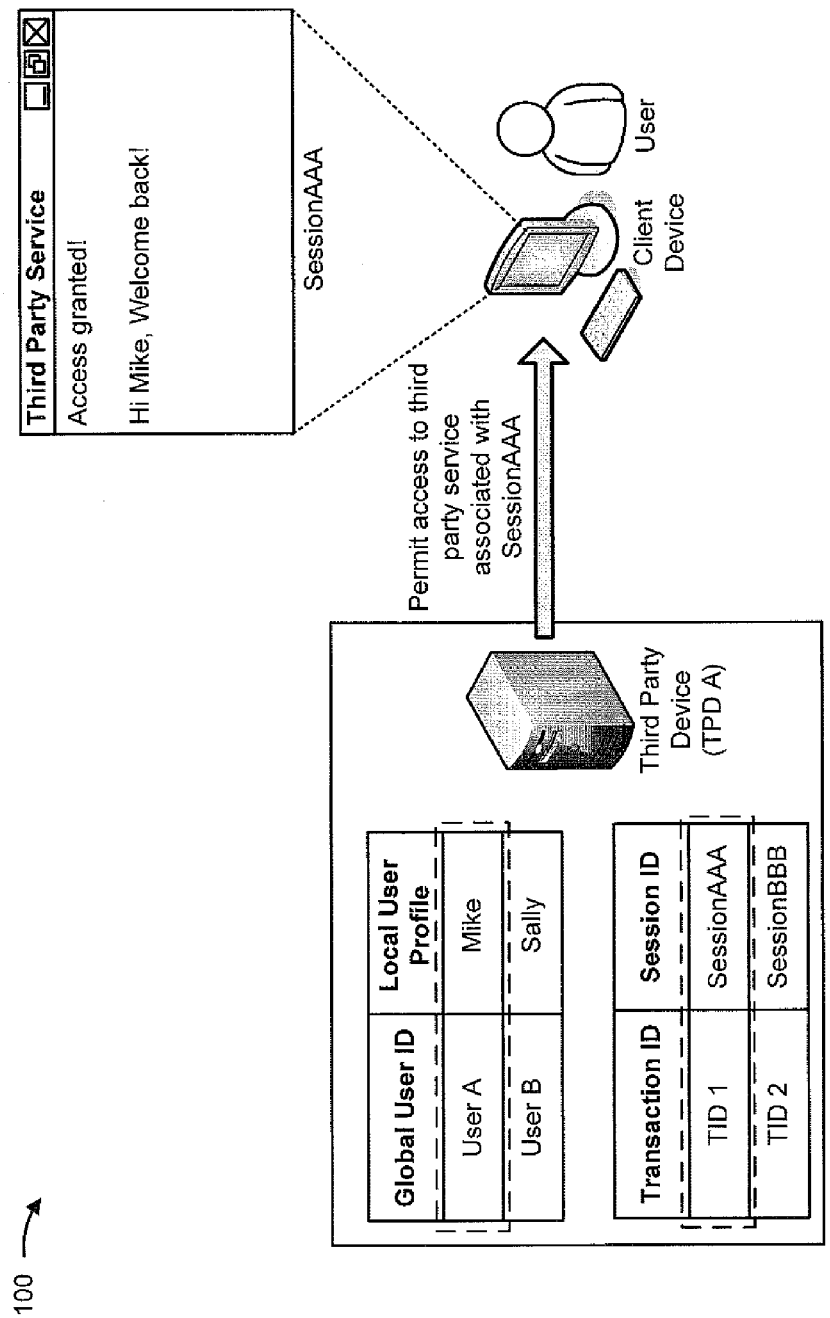

FIGS. 1A and 1B are diagrams of an overview of an example implementation 100 described herein. As shown in FIG. 1A, a user may use a client device to access a third party service, such as a website, a private network, a payment processing system, or the like, using a global authentication service that uses an authentication code and a global user identifier to authenticate a user. For example, assume that the user uses the client device to access a third party website provided by a third party device identified as TPD A. Assume that the session between the client device and the third party device is identified as SessionAAA. As further shown, assume that the third party website provides an authentication code, such as a Quick Response (QR) code. Assume that the QR code may be represented textually as "xyz123."

As shown, assume that the user scans the QR code using a mobile device identified as Mobile Device A. Assume that the mobile device provides the QR code (xyz123) and the mobile device identifier (Mobile Device A) to an authentication device. The authentication device may search a data structure to identify a global user identifier (User A) associated with the mobile device identifier (Mobile Device A), and to identify a transaction identifier (TID 1) and a third party device identifier (TPD A) associated with the QR code. As shown, the authentication device may provide the global user identifier (User A) and the transaction identifier (TID 1) to the third party device identified by the third party device identifier (TPD A).

As shown in FIG. 1B, the third party device may search a data structure to identify a local user profile (Mike) associated with the global user identifier (User A), and to identify a session identifier (SessionAAA) associated with the transaction identifier (TID 1). The third party device may permit the client device, associated with SessionAAA, to access the third party service, and may use the local user profile to provide the service (e.g., to identify user preferences associated with the website). In this way, the user may securely access protected resources without using a username or a password.

Figure 2:
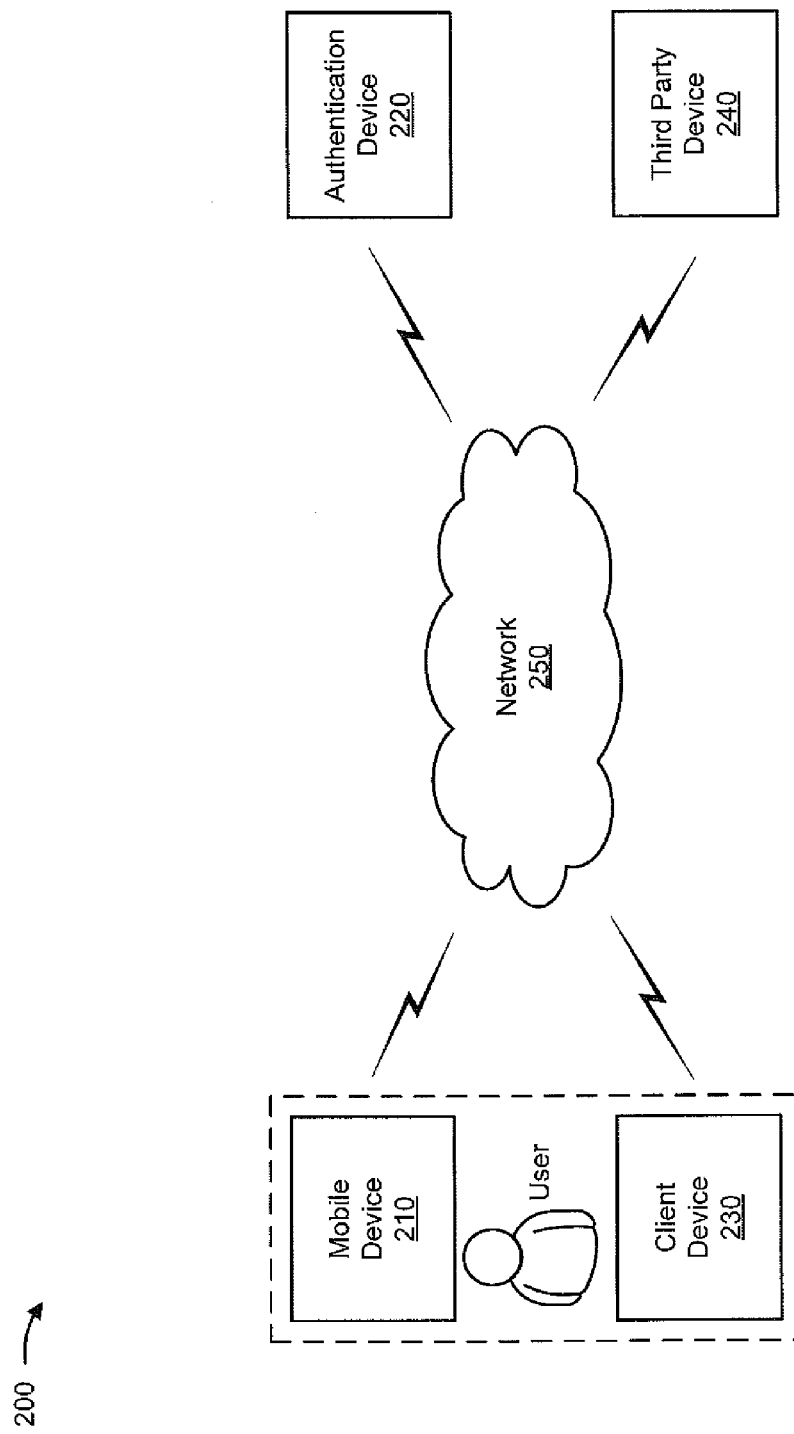
FIG. 2 is a diagram of an example environment in which systems and/or methods, described, herein may be implemented.

FIG. 2 is a diagram of an example environment 200 in which systems and/or methods, described herein, may be implemented. As shown in FIG. 2, environment 200 may include a mobile device 210, an authentication device 220, a client device 230, a third party device 240, and a network 250. As further shown, mobile device 210 and client device 230 may be associated with the same user. Devices of environment 200 may interconnect via wired connections, wireless connections, or a combination of wired and wireless connections.

Mobile device 210 may include one or more devices capable of receiving, generating, storing, processing, and/or providing information associated with a global authentication service (e.g., registration information, encrypted information, user preferences, an authentication code, and/or other information described herein). For example, mobile device 210 may include a mobile phone (e.g., a smart phone, a radiotelephone, etc.), a tablet computer, a handheld computer, a personal digital assistant, or a similar device. Mobile device 210 may be registered for a global authentication service provided via authentication device 220. Once registered, mobile device 210 may be authenticated using authentication device 220 (e.g., using public key cryptography, a digital certificate, etc.) when a user, associated with mobile device 210, uses client device 230 to attempt to access a service provided via third party device 240.

Authentication device 220 may include one or more devices capable of receiving, generating, storing, processing, and/or providing information associated with a global authentication service, and/or capable of authenticating a user and/or a device (e.g., mobile device 210 and/or client device 230) using the global authentication service. For example, authentication device 220 may include a computing device, such as a server (e.g., an authentication server, a firewall, etc.), a network device, or a similar device. Authentication device 220 may register mobile device 210, associated with a user, for a global authentication service. Additionally, or alternatively, authentication device 220 may register third party device 240, associated with a third party service provider, for the global authentication service. Authentication device 220 may authenticate the user, associated with mobile device 210, when the user uses client device 230 to attempt to access a service provided via third party device 240.

Client device 230 may include a device capable of receiving, generating, storing, processing, and/or providing information associated with a global authentication service. In some implementations, client device 230 may include one or more devices used to provide access to a third party service. For example, client device 230 may include a computing device, such as a desktop computer, a laptop computer, a tablet computer, a handheld computer, a phone (e.g., a mobile phone, a smart phone, a radiotelephone, a wireline phone, etc.), or a similar device. Additionally, or alternatively, client device 230 may include an automated teller machine (ATM), a card reader (e.g., a credit card reader), a set-top box, a device that controls whether a vehicle (e.g., a car) may be started, a device that controls access to a building (e.g., a security system), a gaming device, or another device that provides an interface for a user to access a third party service. A user, associated with mobile device 210, may use client device 230 to attempt to access a third party service, provided by third party device 240, using a global authentication service. Third party device 240 may receive an indication that the user has been authentication when authentication device 220 validates the user via mobile device 210.

Third party device 240 may include one or more devices capable of receiving, generating, storing, processing, and/or providing information associated with a third party service and/or a global authentication service. For example, server device 240 may include a computing device, such as a server (e.g., a content server, a web server, a host server, a database server, a voice portal server, a payment processing server, a credit card processing server, etc.), a security device (e.g., a firewall, a gateway, an access point, etc.), an interactive voice recognition device, or a similar device. Third party device 240 may provide access to a third party service. When a user uses client device 230 to attempt to access a third party service provided by third party device 240, third party device 240 may obtain an authentication code from authentication device 220, and may provide the authentication code to client device 230. Mobile device 210 may obtain the authentication code from client device 230, and may provide the authentication code to authentication device 220. Authentication device 220 may use the authentication code to authenticate the user using a global authentication service, and may provide an indication to third party device 240 of whether the user has been authenticated. Third party device 240 may permit or deny access by client device 230 to a third party service based on whether the user has been authenticated.

Network 250 may include one or more wired and/or wireless networks. For example, network 250 may include a cellular network (e.g. a code division multiple access (CDMA) network, a long term evolution (LTE) network, etc.), a public land mobile network (PLMN), a local area network (LAN), a wide area network (WAN), a metropolitan area network (MAN), a telephone network (e.g., the Public Switched Telephone Network (PSTN)), a near field communication (NFC) network, an ad hoc network, an intranet, the Internet, a fiber optic-based network, a private network, a cloud computing network, and/or a combination of these or other types of networks.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
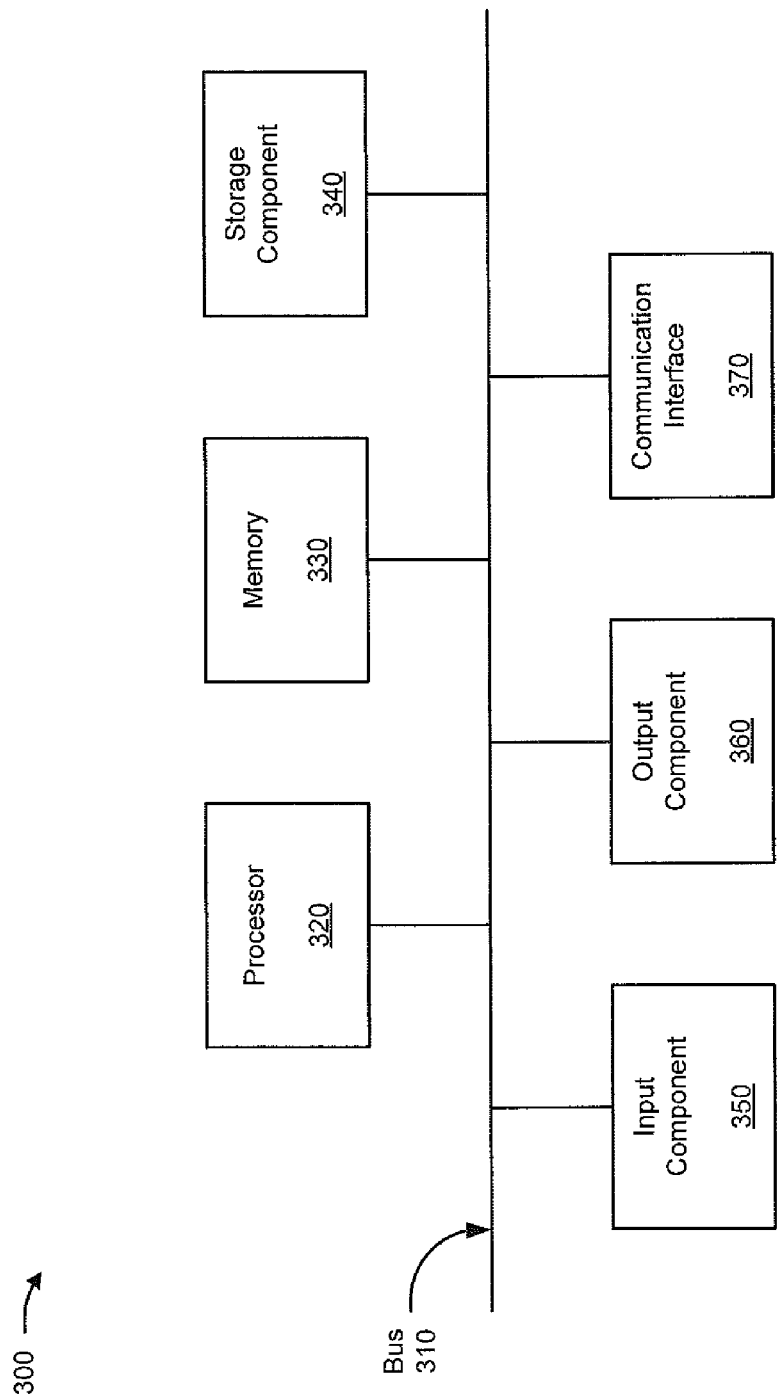
FIG. 3 is a diagram of example components of one or more devices of FIG. 2.

FIG. 3 is a diagram of example components of a device 300. Device 300 may correspond to mobile device 210, authentication device 220, client device 230, and/or third party device 240. In some implementations, mobile device 210, authentication device 220, client device 230, and/or third party device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
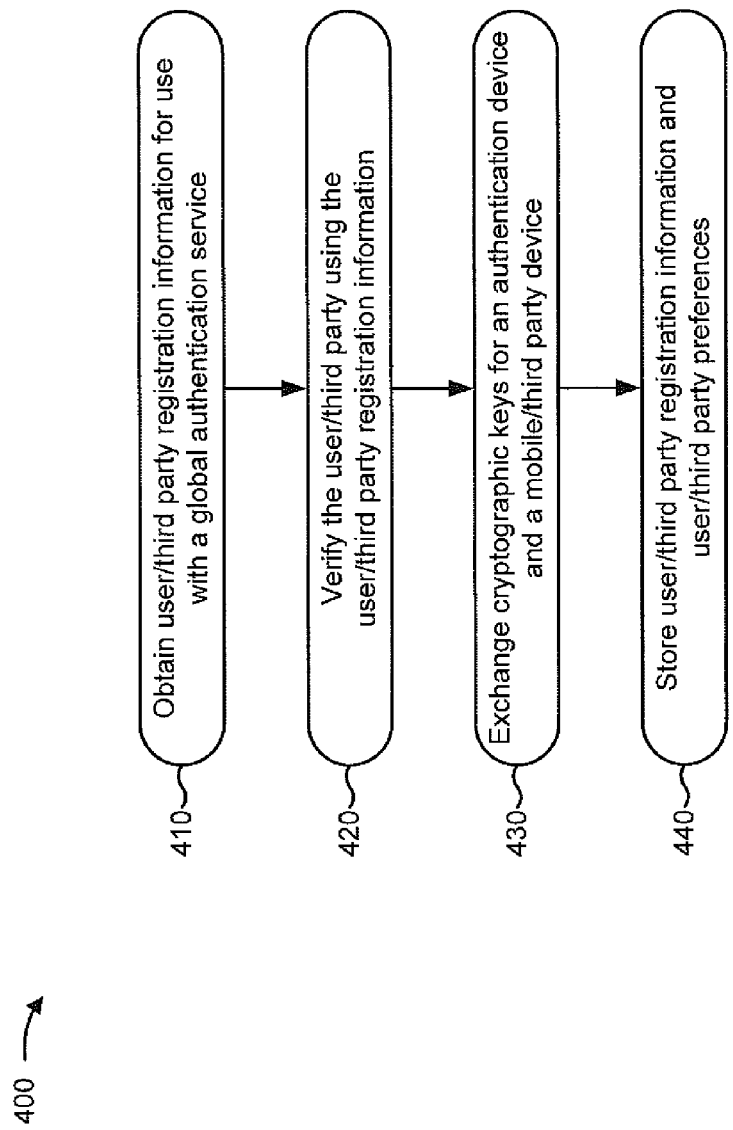
FIG. 4 is a flow chart of an example process for registering a user or a third party for a global authentication service.

FIG. 4 is a flow chart of an example process 400 for registering a user or a third party for a global authentication service. In some implementations, one or more process blocks of FIG. 4 may be performed by authentication device 220. In some implementations, one or more process blocks of FIG. 4 may be performed by another device or a group of devices separate from or including authentication device 220, such as mobile device 210, client device 230, and/or third party device 240.

As shown in FIG. 4, process 400 may include obtaining user and/or third party registration information for use with a global authentication service (block 410). For example, authentication device 220 may obtain user registration information (e.g., from mobile device 210 and/or client device 230), and may obtain third party registration information (e.g., from third party device 240 and/or another device). For example, a user may input user registration information via mobile device 210, and mobile device 210 may provide the user registration information to authentication device 220. Similarly, a third party administrator may input third party registration information via a device (e.g., a computing device), and the device may provide the third party registration information to authentication device 220. Additionally, or alternatively, an administrator associated with the global authentication service may obtain the user and/or third party registration information (e.g., over the phone), and may input the registration information to a device that provides the registration information to authentication device 220. Authentication device 220 may use user registration information to register a user for a global authentication service, and may use third party registration information to register a third party for the global authentication service.

User registration information may include, for example, an email address associated with a user, a mobile device identifier associated with the user and mobile device 210 (e.g., a Mobile Telephone Number (MTN), an International Mobile Subscriber Identity (IMSI), an International Mobile Station Equipment Identity (IMEI), an Integrated Services for Digital Network (ISDN) Number, etc.), a global user identifier to be used with the global authentication service (e.g., which may include a username, an email address, a mobile device identifier, a unique user identifier, an identifier that identifies client device 230, etc.), a user credential (e.g., a personal identification number (PIN), a keyword, an answer to a challenge question, etc.), personal information (e.g., the user's name, address, etc.), payment information to be used for global approval of payments (e.g., credit card information, bank information, etc.), etc. In some implementations, user registration information (e.g., an email address and/or a mobile device identifier) may be used to validate the user and complete registration.

In some implementations, authentication device 220 may determine whether the user registration information includes user registration information that has already been stored. For example, authentication device 220 may determine whether a credit card number has already been registered. In this case, authentication device 220 may notify a user associated with the credit card number (e.g., a user that previously registered the credit card number), such as by sending an email message to an email address associated with the user. Additionally, or alternatively, authentication device 220 may blacklist the credit card by preventing it from being used for future purchases. In this way, authentication device 220 may prevent a hacker from circumventing credit card protections by attempting to re-register a stolen credit card using the hacker's mobile device 210.

Third party registration information may include, for example, a name of a third party service provider registering for the global authentication service, a service identifier that identifies a type of service offered by the third party service provider, an email address associated with the third party service provider, a website identifier associated with the third party service provider, a third party device identifier associated with third party device 240, etc. A third party device identifier may identify a third party device 240 that provides a third party service, may identify a group of third party devices 240 that provide a third party service (e.g., a data center), may identify one or more third party devices 240 associated with a particular deployment, a particular geographic region, etc. A particular website identifier may be associated with multiple third party device identifiers (e.g., when a website is deployed using multiple data centers in different geographic regions), in some implementations.

As further shown in FIG. 4, process 400 may include verifying the user and/or the third party using the user and/or third party registration information (block 420). For example, authentication device 220 may verify an identity of the user using the user registration information, and/or may verify an identity of the third party using the third party registration information. As an example, authentication device 220 may transmit a verification code to a destination associated with the user and/or the third party (e.g., an email address, mobile device 210, third party server 240, etc.), and may request that the user and/or the third party provide the verification code back to authentication device 220 (e.g., via a website associated with the global authentication service, via a text message, via an email, etc.). Authentication device 220 may receive the input code, and may compare the input code to the transmitted verification code. If the codes match, authentication device 220 may verify the user and/or the third party.

In some implementations, authentication device 220 may cause mobile device 210 to execute a global authentication application, and the application may provide information, regarding mobile device 210, to authentication device 220. Authentication device 220 may use the information to verify a user of mobile device 210.

As further shown in FIG. 4, process 400 may include exchanging cryptographic keys for an authentication device and a mobile device and/or a third party device (block 430). For example, after verifying the user, authentication device 220 may exchange cryptographic keys with mobile device 210. In some implementations, authentication device 220 may provide a public key, associated with authentication device 220 (e.g., the global authentication service), to mobile device 210. Authentication device 220 may store a corresponding private key for use with the global authentication service.

Additionally, or alternatively, when mobile device 210 is verified and registered, authentication device 220 may cause mobile device 210 to generate and store a private key (e.g., associated with a digital certificate) for use with the global authentication service, and to provide a corresponding public key (e.g., associated with the digital certificate) to authentication device 220. Additionally, or alternatively, authentication device 220 may generate the private key and transmit the private key to mobile device 210, so long as authentication device 220 does not retain a copy of the private key. The public-private key pair for mobile device 210 may be uniquely generated based on, for example, an email address and a device identifier of mobile device 210. In this way, authentication device 220 and mobile device 210 can securely communicate using encrypted messages (e.g., via an encrypted session).

In other words, authentication device 220 may cause mobile device 210 to obtain a digital certificate (e.g., a public key certificate). The digital certificate may include an electronic document that uses a digital signature to bind a public key with an identity (e.g., a user identity, a mobile device identity, etc.). Mobile device 210 may use the digital certificate to verify that a public key belongs to authentication device 220. Authentication device 220 may use the digital certificate to verify that a public key belongs to a user and/or mobile device 210. Authentication device 220 may exchange cryptographic keys and/or digital certificates with third party device 240 in a similar manner.

As further shown in FIG. 4, process 400 may include storing user and/or third party registration information (block 440). For example, authentication device 220 may store user registration information and/or third party registration information. Authentication device 220 may store this information in one or more data structures. In some implementations, authentication device 220 may store information that identifies an association between a particular global user identifier and a particular mobile device 210 (e.g., using a mobile device identifier). In this way, when a user uses mobile device 210 to send an authentication code to authentication device 220, authentication device 220 may identify a global user identifier based on a mobile device identifier that identifies mobile device 210, as described in more detail elsewhere herein.

In some implementations, a user may revoke a digital certificate (e.g., a public-private key pair) associated with mobile device 210, and/or may revoke a global user identifier. For example, the user may lose mobile device 210, and may wish to revoke the digital certificate and/or the global user identifier for security purposes. In this case, authentication device 220 may receive a revocation request (e.g., based on a user interaction with client device 230, based on input from another device, etc.), and may revoke the digital certificate and/or the global user identifier. For example, the user may interact with client device 230 to input an email address, a device identifier, and/or a PIN used to register for the global authentication service, and client device 230 may provide this information to authentication device 220 along with a revocation request. When revoking the digital certificate and/or the global user identifier, authentication device 220 may delete information stored in a data structure and/or may mark such information as invalid (e.g., may mark a stored public key as invalid), such as user registration information.

When a user obtains a new mobile device 210, the user may register the new mobile device 210 for the global authentication service, as described above. In some implementations, authentication device 220 may retain information associated with the user when a digital certificate and/or a global user identifier is revoked so that the user may access the information (e.g., a transaction history) when the user registers the new mobile device 210. The user may register the new mobile device 210 using a same email address, a same PIN, and/or a same mobile device identifier (e.g., the new mobile device 210 may have a same mobile telephone number as the lost/replaced mobile device 210) to associate information, previously stored in association with the lost/replaced mobile device 210, with the new mobile device 210.

Multiple global user identifiers may be associated with a single mobile device 210, in some implementations. For example, two or more users may share a single mobile device 210. In this case, each user may register for the global authentication service using different global user identifiers and the same device identifier. A different digital certificate (e.g., public-private key pair) may be created for each user, and stored by mobile device 210. In this case, authentication device 220 may determine a global user identifier, associated with a mobile device identifier, based on information identifying a user of mobile device 210 (e.g., information identifying a user that is logged in to mobile device 210; authentication information input by a user of mobile device 210, such as a username, a password, etc.; or the like). Additionally, or alternatively, a single global user identifier may be associated with multiple mobile devices 210. For example, a user may have multiple mobile devices 210, such as a smart phone, a tablet, etc., and may register to use the global authentication service on each mobile device 210 (e.g., thus associating a single global user identifier with each mobile device 210).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5D are diagrams of an example implementation 500 relating to example process 400 shown in FIG. 4. FIGS. 5A-5D show an example of registering a user for a global authentication service.

Figure 5A:
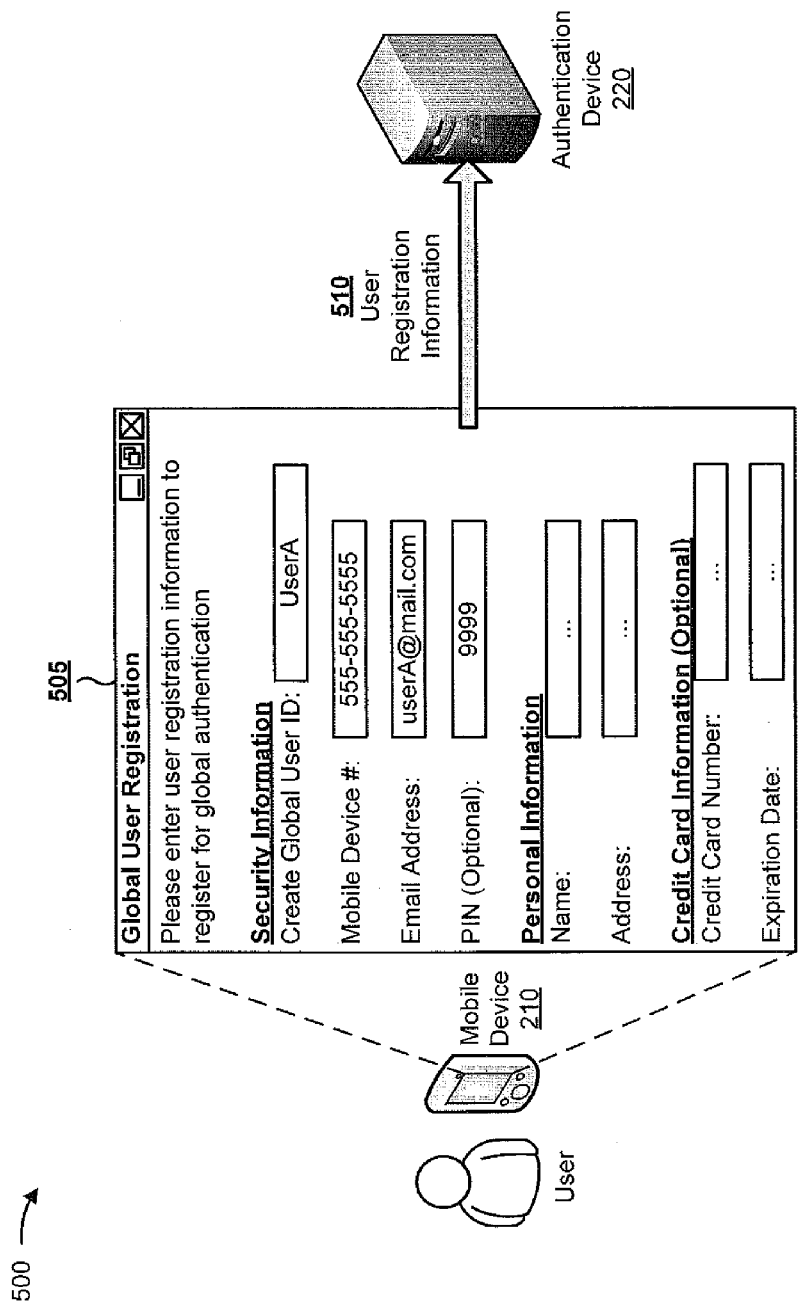
FIGS. 5A-5D are diagrams of an example implementation relating to the example process shown in FIG. 4.

As shown in FIG. 5A, and by reference number 505, assume that a user interacts with mobile device 210 to provide user registration information to register for a global authentication service. For example, assume that the user inputs a global user identifier of "UserA," inputs a mobile telephone number of "555-555-5555," inputs an email address of "userA@mail.com," inputs a PIN of "9999," and inputs other user registration information, such as a name, address, credit card number, credit card expiration date, etc. As shown by reference number 510, mobile device 210 provides the user registration information to authentication device 220, which may store the user registration information.

Figure 5B:
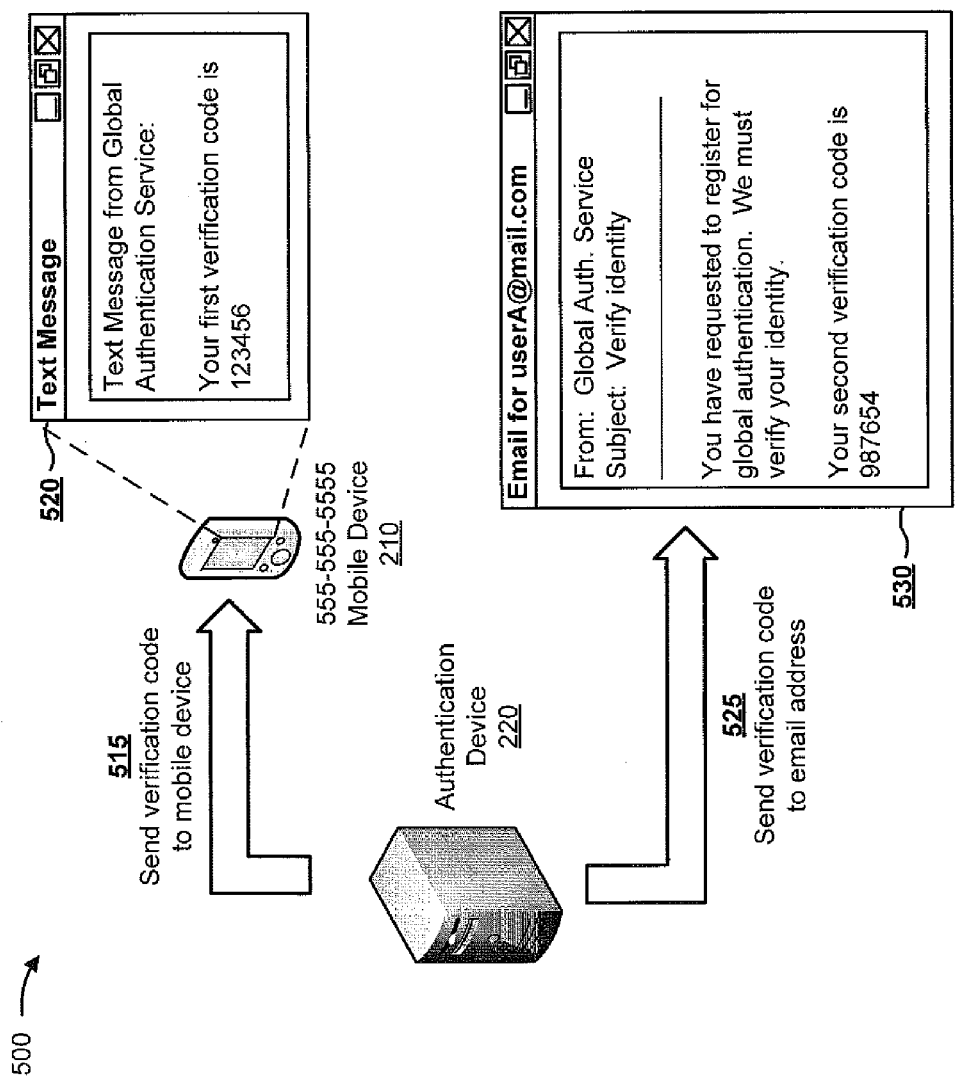

As shown in FIG. 5B, assume that authentication device 220 uses the user registration information to verify an identity of the user. For example, as shown by reference number 515, assume that authentication device 220 sends a first verification code to mobile device 210 with a mobile telephone number of 555-555-5555, identified in the user registration information as being a mobile device of UserA. In one example, authentication device 220 may provide a text message to mobile device 210. As shown by reference number 520, mobile device 210 may provide the text message for display, and the text message may include the first verification code, shown as "123456."

As further shown in FIG. 5B, assume that authentication device 220 also verifies an email address of UserA. For example, as shown by reference number 525, assume that authentication device 220 sends a second verification code (e.g., a different verification code) in an email message to an email address shown as userA@mail.com, which was identified in the user registration information as being an email address of UserA. As shown by reference number 530, the user may access the email message to obtain the second verification code.

Figure 5C:
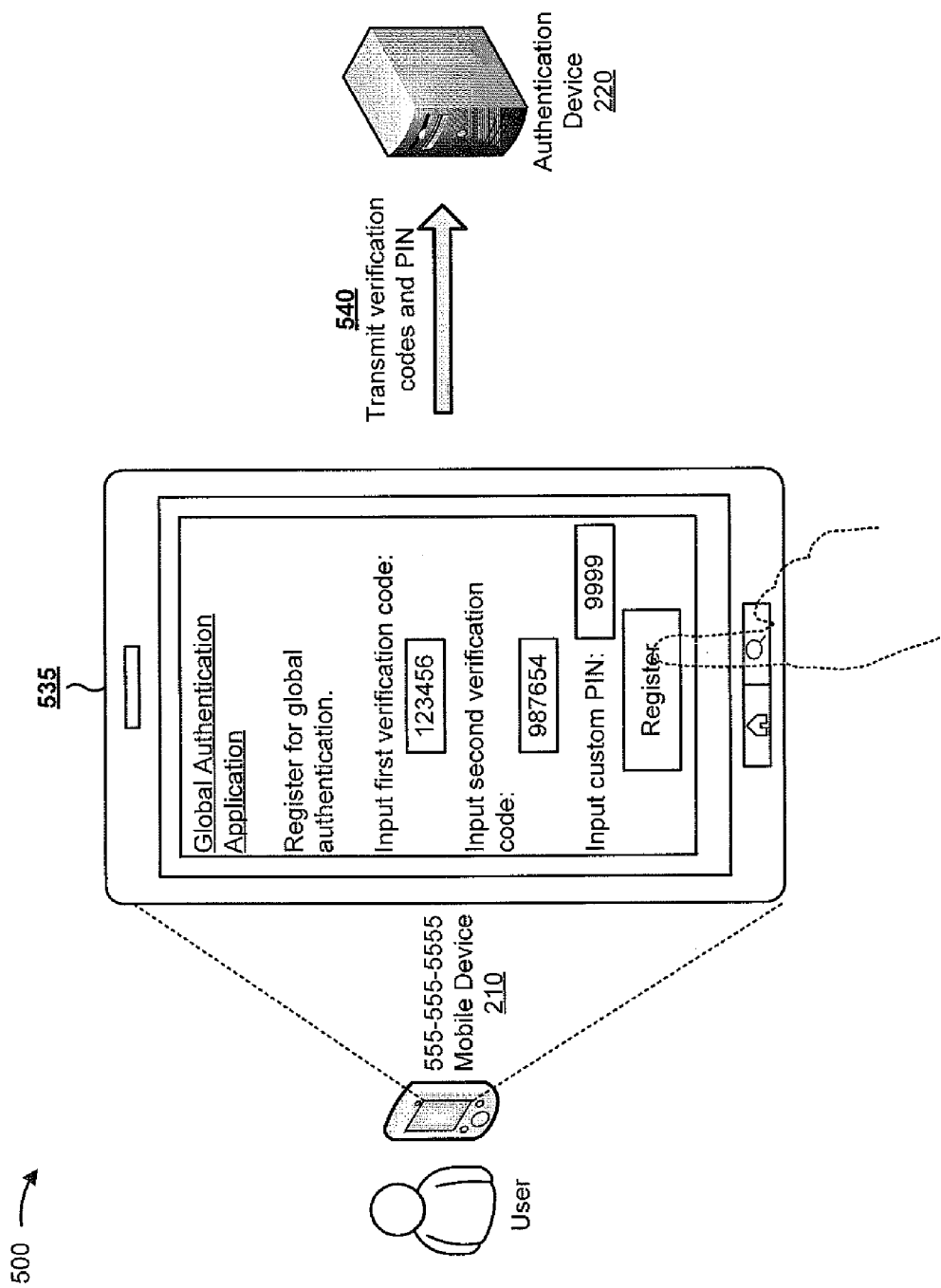

As shown in FIG. 5C, and by reference number 535, the user may obtain the verification codes, and may input the verification codes using a global authentication application executing on mobile device 210. Additionally, or alternatively, the user may input a PIN to be used in association with a global authentication service. In some implementations, the global authentication application, executing on mobile device 210, may automatically obtain the first verification code (e.g., from a text message, from another message that is not a text message, etc.), and may input the first verification code as shown in FIG. 5C. As shown by reference number 540, mobile device 210 may provide the verification codes and the PIN to authentication device 220, and authentication device 220 may verify the user using the first verification code, the second verification code, and/or the PIN.

Figure 5D:
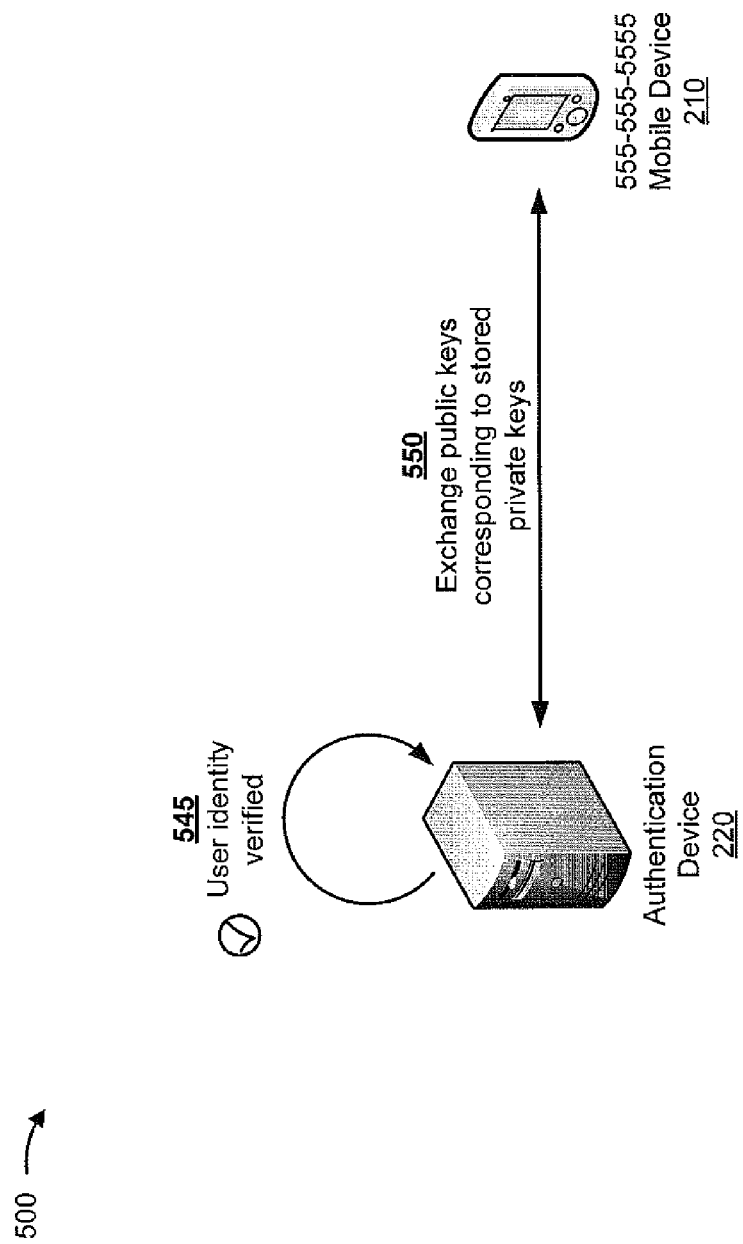

As shown in FIG. 5D, and by reference number 545, authentication device 220 may verify the identity of the user, as described above with respect to FIGS. 5A-5C. Once authentication device 220 has verified the user's identity, authentication device 220 and mobile device 210 (e.g., with an MTN of 555-555-5555) may exchange public keys that correspond to private keys stored by each device, as shown by reference number 550. In some implementations, verification of the user's identity by authentication device 220 may trigger the creation of a private key (e.g., by mobile device 210). The exchange of public keys permits mobile device 210 and authentication device 220 to communicate securely, as described in more detail elsewhere herein.

As indicated above, FIGS. 5A-5D are provided merely as an example. Other examples are possible and may differ from what was described with regard to FIGS. 5A-5D.

Figure 6A:
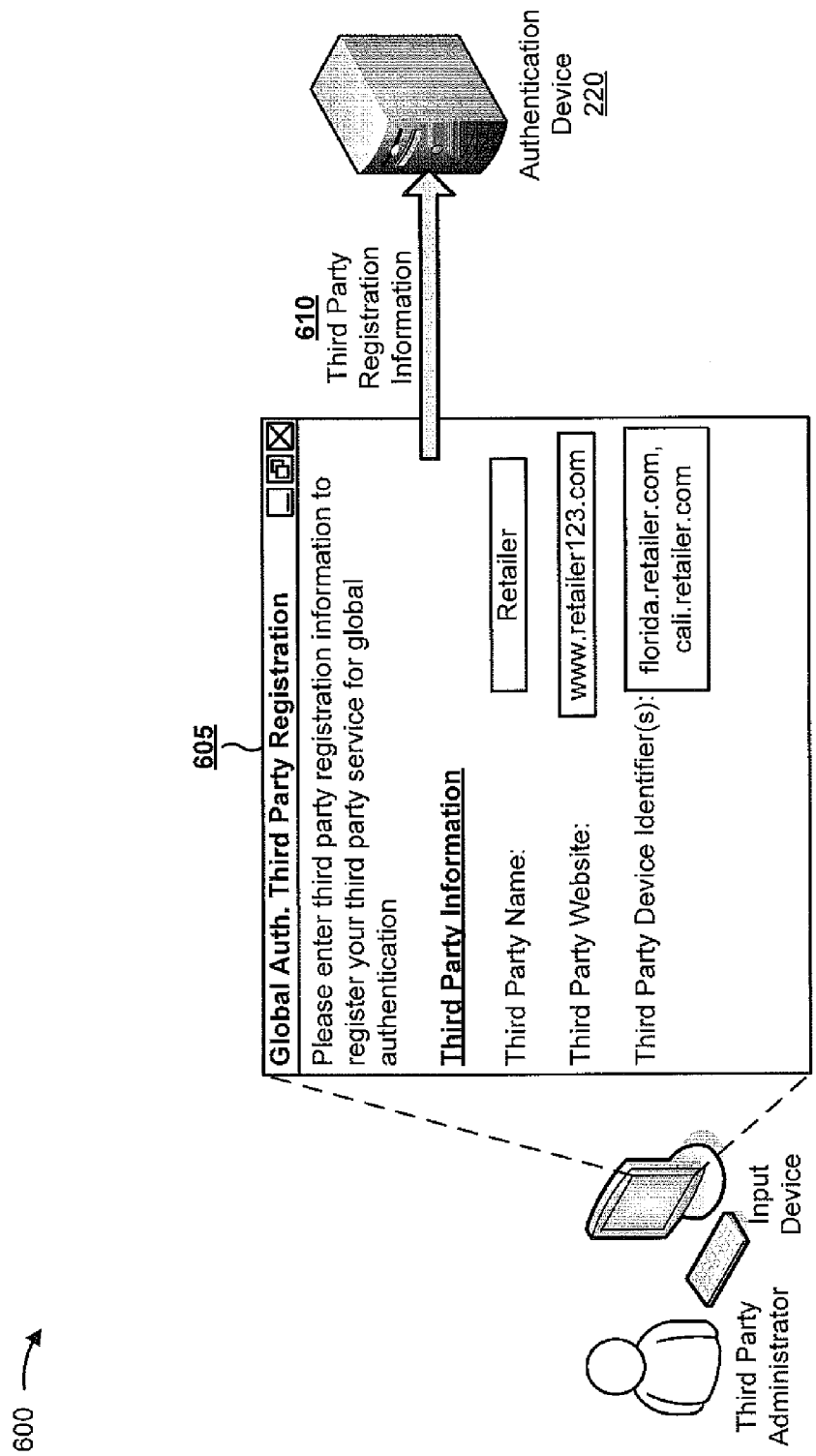
FIGS. 6A and 6B are diagrams of another example implementation relating to the example process shown in FIG. 4.
Figure 6B:
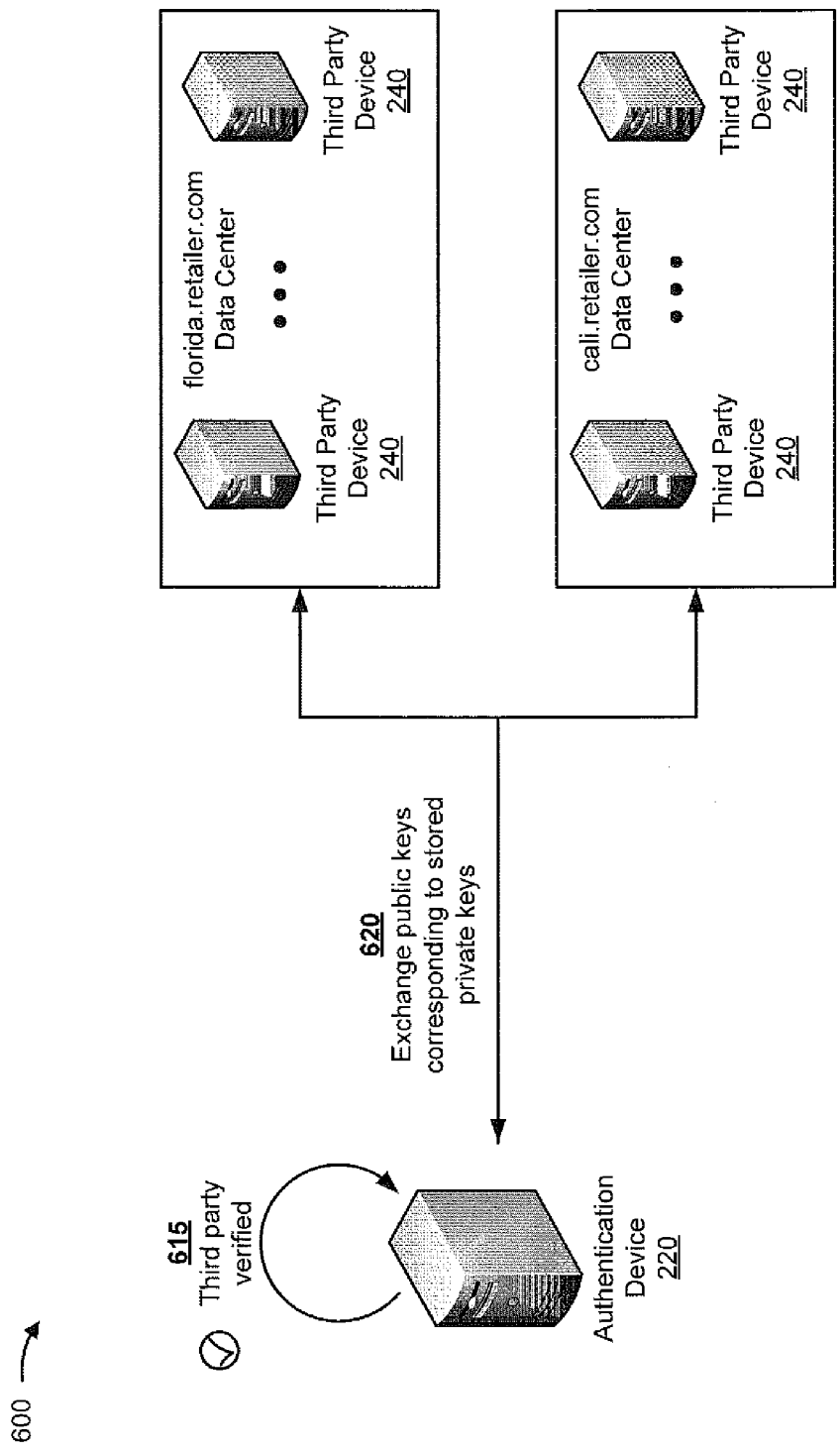

FIGS. 6A and 6B are diagrams of another example implementation 600 relating to example process 400 shown in FIG. 4. FIGS. 6A and 6B show an example of registering a third party for a global authentication service.

As shown in FIG. 6A, and by reference number 605, assume that a third party administrator interacts with an input device (e.g., third party device 240, a client device similar to client device 230, etc.) to provide third party registration information to register for a global authentication service. For example, assume that the third party inputs a third party name of "Retailer," inputs a third party website identifier of "www.retailer123.com," and inputs two third party device identifiers of florida.retailer.com and cali.retailer.com. Assume that the third party device identifiers correspond to different data center deployments that provide the website www.retailer123.com. As shown by reference number 610, the input device provides the third party registration information to authentication device 220, which may store the third party registration information.

As shown in FIG. 6B, and by reference number 615, assume that authentication device 220 verifies the identity of the third party, such as by verifying an email address included in the third party registration information, verifying that a third party device 240 (e.g., identified by a device identifier includes in the third party registration information) is associated with the third party, etc. Once authentication device 220 has verified the third party, authentication device 220 and third party devices 240 (e.g., identified as belonging to a florida.retailer.com data center and a cali.retailer.com data center) may exchange public keys that correspond to private keys stored by each device, as shown by reference number 620. In some implementations, verification of the third party by authentication device 220 may trigger the creation of a private key (e.g., by third party device 240). The exchange of public keys permits third party device 240 and authentication device 220 to communicate securely, as described in more detail elsewhere herein.

As indicated above, FIGS. 6A and 6B are provided merely as an example. Other examples are possible and may differ from what was described with regard to FIGS. 6A and 6B.

Figure 7:
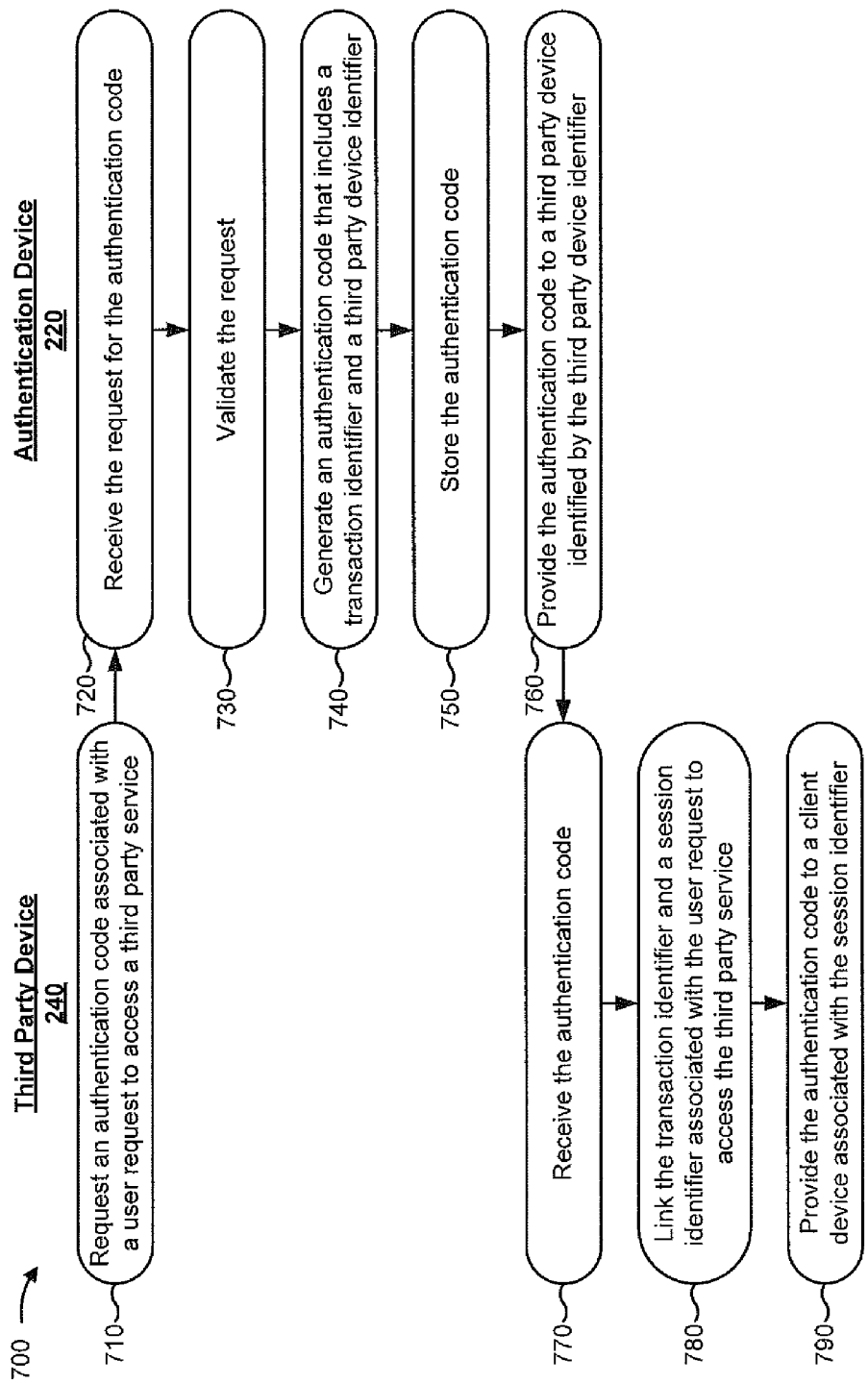
FIG. 7 is a flow chart of an example process for generating and providing an authentication code to be used with a global authentication service.

FIG. 7 is a flow chart of an example process 700 for generating and providing an authentication code to be used with a global authentication service. In some implementations, one or more process blocks of FIG. 7 may be performed by third party device 240 and/or authentication device 220. In some implementations, one or more process blocks of FIG. 7 may be performed by another device or a group of devices separate from or including third party device 240 and/or authentication device 220, such as mobile device 210 and/or client device 230.

As shown in FIG. 7, process 700 may include requesting an authentication code associated with a user request to access a third party service (block 710), receiving the request for the authentication code (block 720), and validating the request (block 730). For example, a user may interact with client device 230 to request access, using a global authentication service, to a third party service provided by third party device 240. Based on the user request, third party device 240 may request an authentication code from authentication device 220. An authentication code may refer to a code that stores information described herein (e.g., a transaction identifier, a third party device identifier, etc.), and may include, for example, a QR code, a string of characters, a hash value, etc. Unique authentication codes may be associated with different communication sessions, such that a particular authentication code is associated with a particular session. As an example, third party device 240 may request a new authentication code when client device 230 attempts to access a website associated with third party device 240, refreshes the website, closes a browser and reloads the website, etc.

The request for the authentication code may include, for example, a web site identifier that identifies a web site associated with the user request for the third party service (and/or a service identifier that identifies a third party service being requested), a third party device identifier that identifies a third party device 240 that provides the third party service, or the like. Additionally, or alternatively, the request for the authentication code may identify a date on which the user request was made, a time at which the user request was made, a type of user request (e.g., a login request, a purchase request, etc.), or the like.

Authentication device 220 may receive the request for the authentication code, and may validate the request. In some implementations, third party device 240 may encrypt the request, and may sign the request using a digital signature. For example, third party device 240 may use a public key, associated with authentication device 220, to encrypt the request, and authentication device 220 may use a corresponding private key to decrypt the request. Additionally, or alternatively, third party device 240 may use a private key, associated with third party device 240, to create a digital signature for the request, and authentication device 220 may verify the digital signature using a corresponding public key. In this way, authentication device 220 may validate the request. If the request cannot be validated, then authentication device 220 may ignore the request, may send a notification regarding the request (e.g., to an email address associated with a global authentication service administrator), or the like.

As further shown in FIG. 7, process 700 may include generating an authentication code that includes a transaction identifier and a third party device identifier (block 740), storing the authentication code (block 750), and providing the authentication code to a third party device identified by the third party device identifier (block 760). For example, authentication device 220 may generate an authentication code based on validating the request for the authentication code. The authentication code may include a unique transaction identifier, which may be used to link a global user identifier to a session (e.g., a communication session between client device 230 and third party device 240). In some implementations, the transaction identifier may include a plaintext and/or a cleartext version of the authentication code (e.g., a QR code).

Additionally, or alternatively, the authentication code may include a third party device identifier that identifies one or more third party devices 240 that provide the requested third party service. Authentication device 220 may determine the third party device identifier to be included in the authentication code based on information included in the request for the authentication code, which may identify a third party device 240 from which the request for the authentication code was received.

Authentication device 220 may store the authentication code (e.g., in a data structure). For example, authentication device 220 may store an indication of a relationship between a transaction identifier, a website identifier, a third party device identifier, or the like. Authentication device 220 may store this information for later use, such as to determine the transaction identifier, the website identifier, the third party device identifier, etc., when an authentication code is received at a later time (e.g., from mobile device 210). In some implementations, authentication device 220 may store this information for a particular amount of time (e.g., an expiry time, a time-out time, etc.), after which the information (e.g., the authentication code) is invalid. Additionally, or alternatively, authentication device 220 may store a transaction identifier, and may not store a third party device identifier. In this case, authentication device 220 may receive the third party device identifier in communications received from third party device 240.

Authentication device 220 may provide the authentication code to third party device 240 identified by the third party device identifier included in the authentication code (e.g., a third party device 240 from which the request for the authentication code was received).

As further shown in FIG. 7, process 700 may include receiving the authentication code (block 770), linking the transaction identifier and a session identifier associated with the user request to access the third party service (block 780), and providing the authentication code to a client device associated with the session identifier (block 790). For example, third party device 240 may receive the authentication code from authentication device 220. Third party device 240 may determine the transaction identifier included in the authentication code, and may link the transaction identifier to a session identifier associated with the user request to access the third party service. The session identifier may include, for example, a string of characters that identifies a communication session between client device 230 and third party device 240. For example, the session identifier may identify a session between client device 230, that triggered the request for the authentication code, and third party device 240.

Third party device 240 may store (e.g., in a data structure) an indication of a relationship between the transaction identifier and the session identifier. Third party device 240 may store this information for later use, such as to determine the session identifier, using the transaction identifier, to permit client device 230 to access the third party service using a global authentication service. The transaction identifier and/or the authentication code may be used for a single transaction (e.g., a single request for access to a third party service), and a new transaction identifier and/or authentication code may be generated and/or stored for each transaction.

Third party device 240 may provide the authentication code to client device 240 associated with the session identifier. For example, the session identifier may identify a session between third party device 240 and a particular client device 230, and third party device 240 may provide the authentication code to the particular client device 230 (e.g., a client device 230 from which the user request was received). Mobile device 210 may obtain the authentication code from client device 230. In this way, mobile device 210 may be used to authenticate a user via a global authentication service, as described in more detail elsewhere herein.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8A:
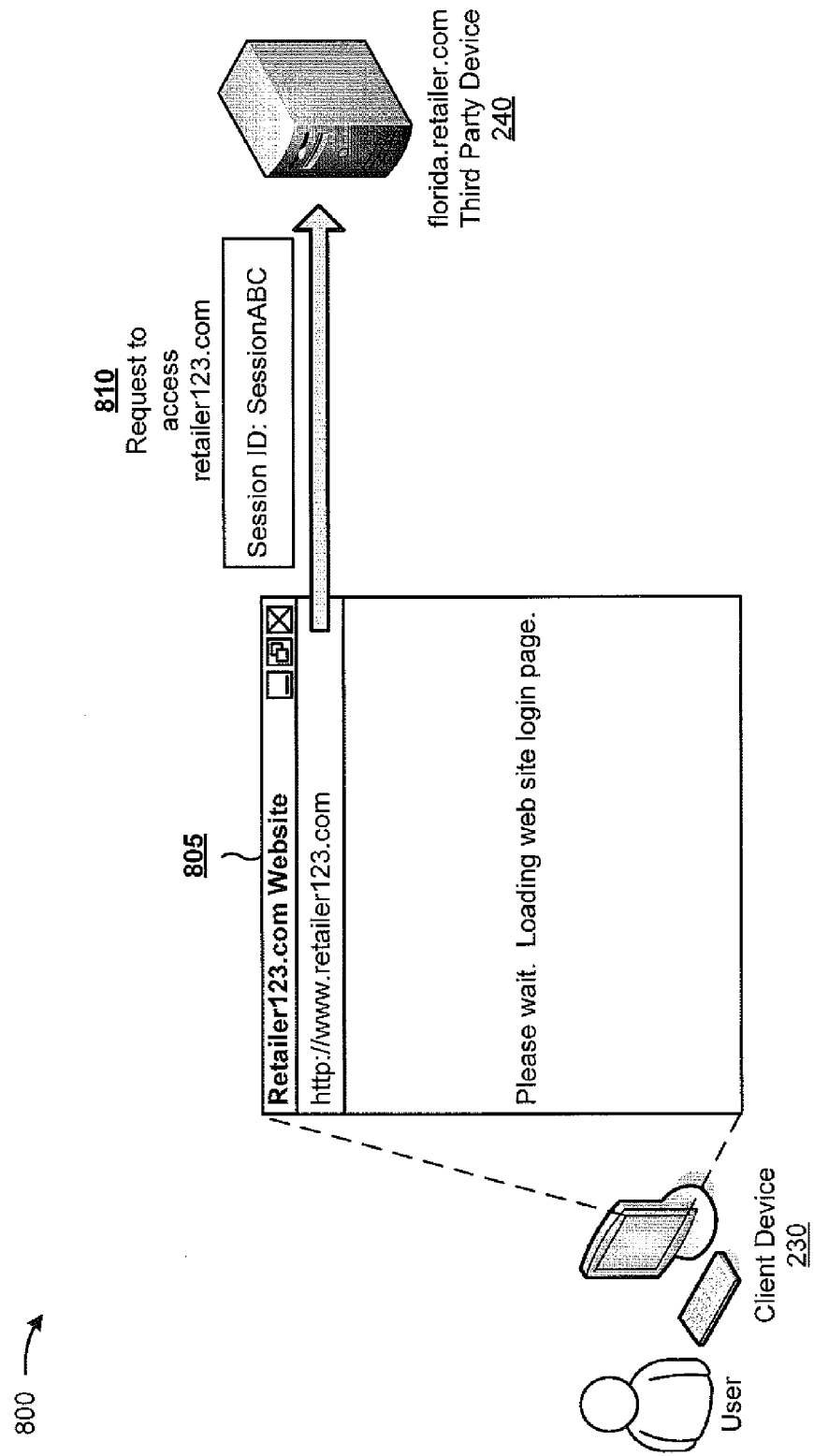
FIGS. 8A-8C are diagrams of an example implementation relating to the example process shown in FIG. 7.
Figure 8B:
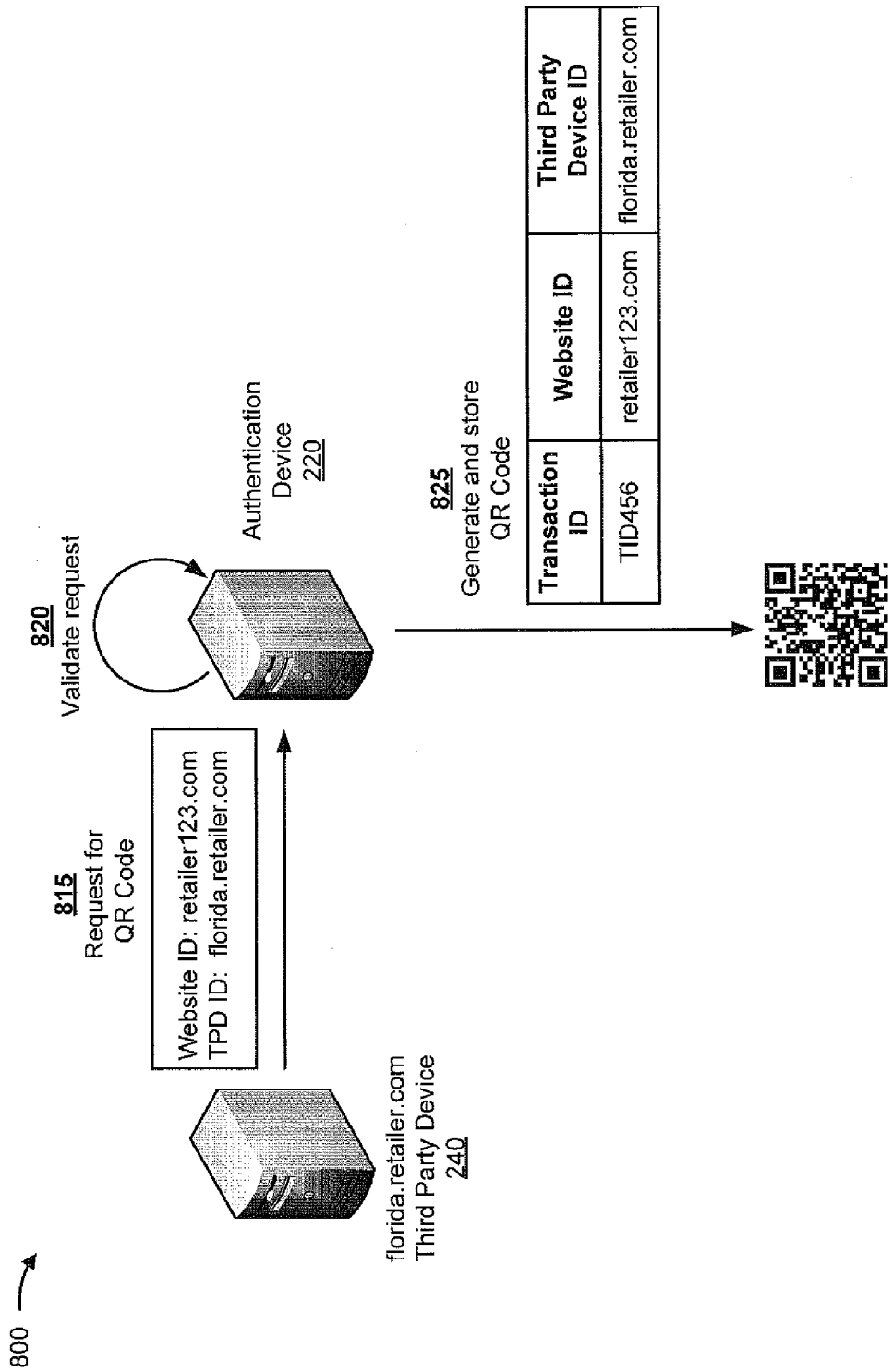
Figure 8C:
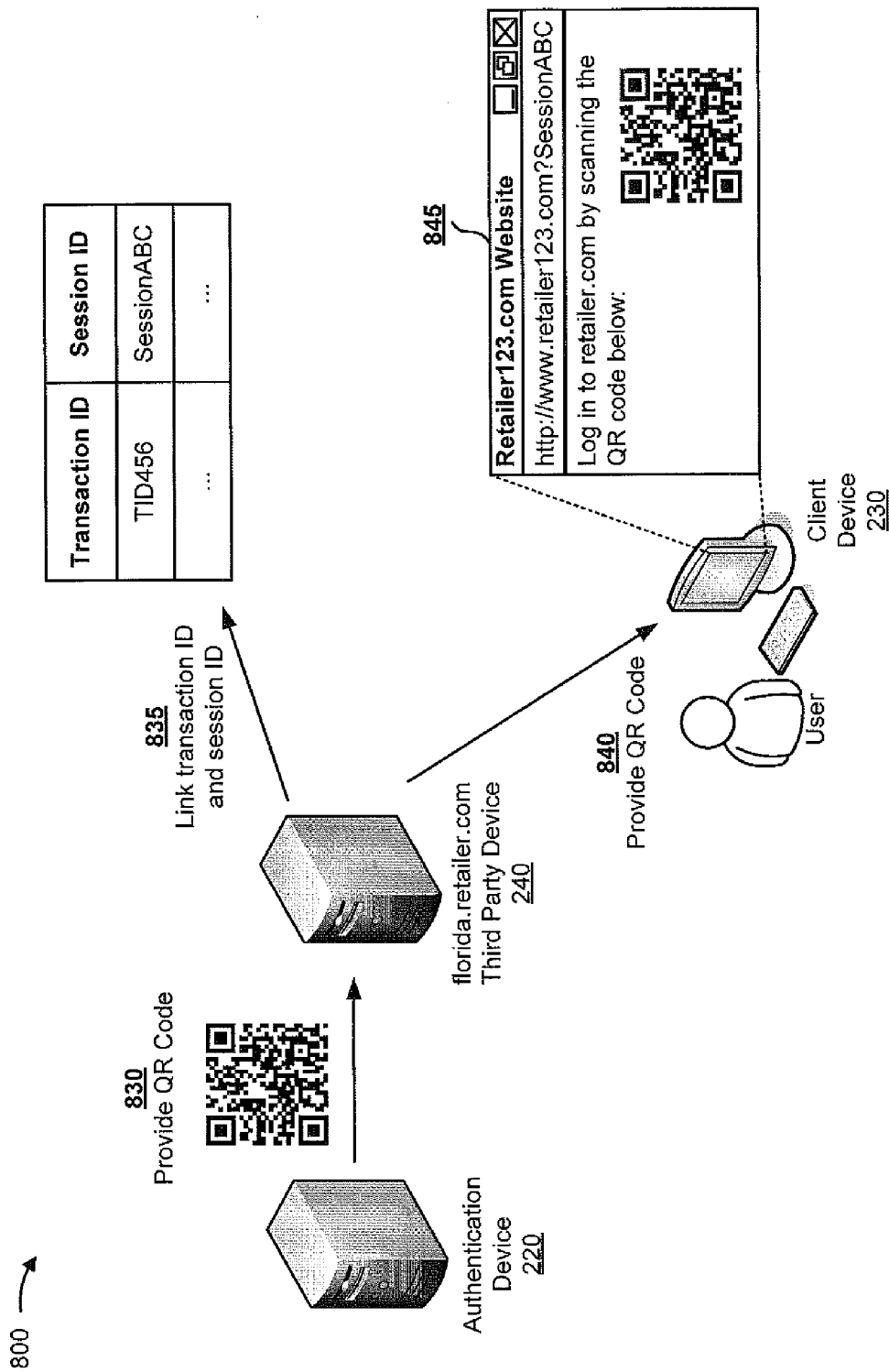

FIGS. 8A-8C are diagrams of an example implementation 800 relating to example process 700 shown in FIG. 7. FIGS. 8A-8C show an example of generating and providing an authentication code to be used with a global authentication service. For the purpose of FIGS. 8A-8C, assume that the operations described herein in connection with FIGS. 5A-5D, 6A, and 6B have been performed.

As shown in FIG. 8A, and by reference number 805, assume that a user interacts with client device 230 to access a login page of a website, shown as http://www.retailer123.com. As shown by reference number 810, assume that client device 230 sends a request to access the retailer123.com website to third party device 240. Assume that third party device 240 (or a data center that includes third party device 240) is identified using a third party device identifier shown as florida.retailer.com. Further, assume that third party device 240 and client device 230 establish a session identifier for the communication session between third party device 240 and client device 230, shown as SessionABC.

As shown in FIG. 8B, and by reference number 815, assume that third party device 240 requests a QR code from authentication device 220. Assume that the request includes a website identifier, shown as retailer123.com, and a third party device identifier, shown as florida.retailer.com. As shown by reference number 820, assume that authentication device 220 validates the request (e.g., by decrypting and verifying a digital certificate received from third party device 240 along with the request). As shown by reference number 825, assume that authentication device 220 generates and stores a QR code, which includes a transaction identifier (shown as TID456), the received website identifier (shown as retailer123.com), and the received third party device identifier (shown as florida.retailer.com).

As shown in FIG. 8C, and by reference number 830, assume that authentication device 220 provides the QR code to third party device 240 (e.g., identified as florida.retailer.com). As shown by reference number 835, assume that third party device 240 links the transaction identifier included in the QR code (shown as TID 456) to a session identifier associated with the communication session with client device 230 (shown as SessionABC). As shown by reference number 840, assume that third party device 240 provides the QR code to client device 230 associated with the session identifier of SessionABC. As shown by reference number 845, assume that client device 230 provides the authentication code for display, which allows a user to use mobile device 210 to scan the QR code to access the third party service after being authenticated by a global authentication service, as described in more detail elsewhere herein.

As indicated above, FIGS. 8A-8C are provided merely as an example. Other examples are possible and may differ from what was described with regard to FIGS. 8A-8C.

Figure 9:
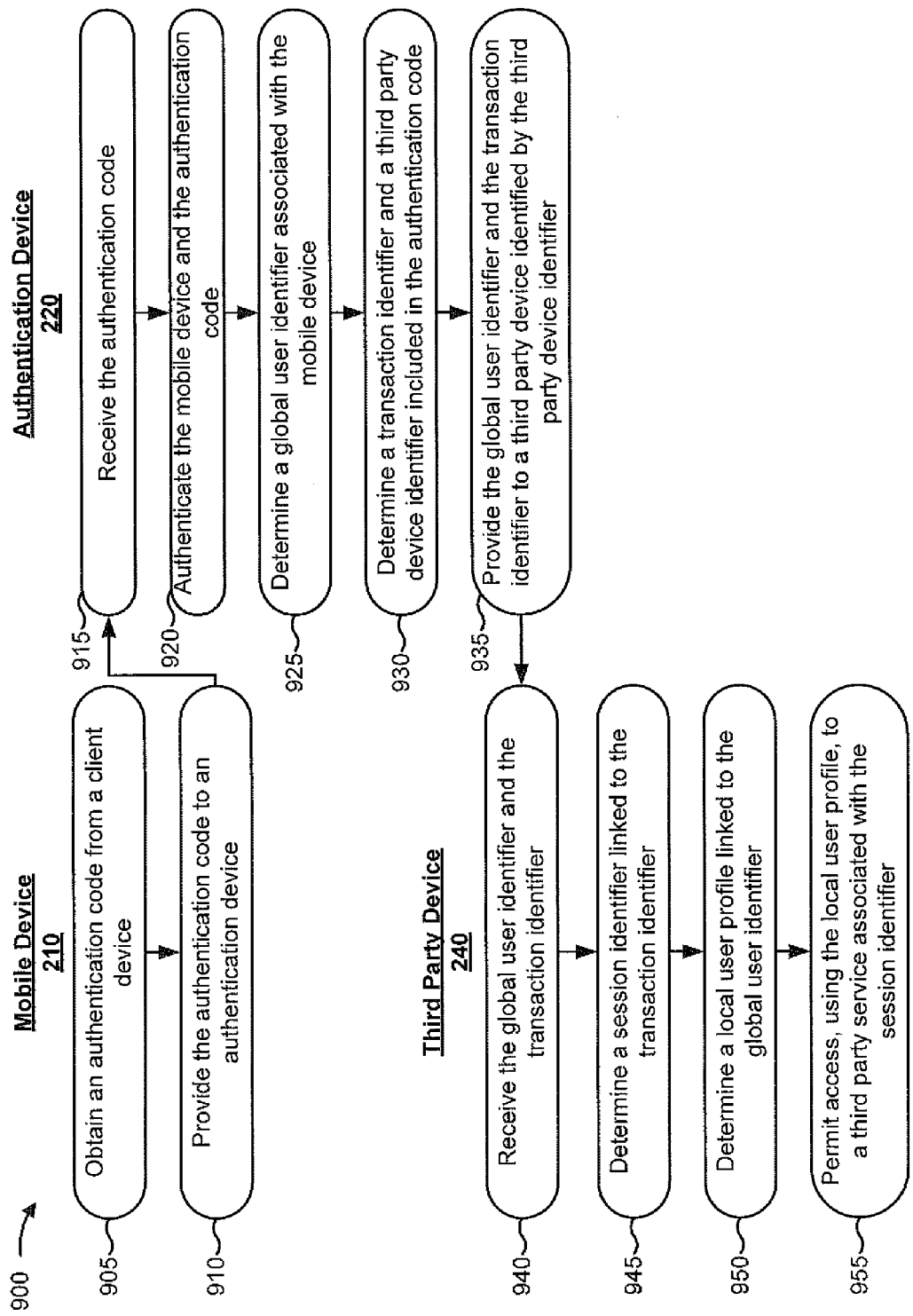
FIG. 9 is a flow chart of an example process for using an authentication code to provide access to a third party service using a global authentication service.

FIG. 9 is a flow chart of an example process 900 for using an authentication code to provide access to a third party service using a global authentication service. In some implementations, one or more process blocks of FIG. 9 may be performed by mobile device 210, authentication device 220, and/or third party device 240. In some implementations, one or more process blocks of FIG. 9 may be performed by another device or a group of devices separate from or including mobile device 210, authentication device 220, and/or third party device 240, such as client device 230.

As shown in FIG. 9, process 900 may include obtaining an authentication code from a client device (block 905), and providing the authentication code to an authentication device (block 910). For example, mobile device 210 may obtain an authentication code from client device 230, which may have received the authentication code from authentication device 220 via third party device 240, as described herein in connection with FIG. 7. In some implementations, such as when the authentication code is a QR code provided for display via client device 230, mobile device 210 may obtain the authentication code by taking a picture of the authentication code and/or scanning the authentication code (e.g., using a camera, a QR code scanning application, etc.). Additionally, or alternatively, mobile device 210 may obtain the authentication code from client device 230 via a communication link between mobile device 210 and client device 230 (e.g., a near-field communication link, such as a Bluetooth link).

Mobile device 210 may provide the obtained authentication code to authentication device 220. In some implementations, mobile device 210 may sign a message provided to authentication device 220, which includes the authentication code, using a digital signature. In this way, authentication device 220 may validate mobile device 210.

In some implementations, mobile device 210 may obtain a deep link (e.g., by scanning a QR code). The deep link may identify a global authentication application and/or a uniform resource locator (URL) associated with the global authentication service. Mobile device 210 may follow the deep link, which may cause mobile device 210 to launch the global authentication application and follow the URL (e.g., and/or send the authentication code to authentication device 220). Additionally, or alternatively, where the global authentication application is not installed on mobile device 210, following the deep link may cause mobile device 210 to download and/or install the global authentication application.

As further shown in FIG. 9, process 900 may include receiving the authentication code (block 915), and authenticating the mobile device and the authentication code (block 920). For example, authentication device 220 may receive the authentication code from mobile device 210 (e.g., via network 250). As an example, authentication device 220 may receive the authentication code from mobile device 210 via the Internet, via a cellular network (e.g., via a text message), etc.

When authentication device 220 and mobile device 210 exchange a message, the message may be encrypted, decrypted, signed, and/or verified as described above. In this way, messages communicated between authentication device 220 and mobile device 210 may be kept secure and confidential. For example, authentication device 220 may authenticate a message from mobile device 210, and may notify third party device 240 whether mobile device 210 was properly authenticated.

In some implementations, authentication device 220 may authenticate the authentication code. For example, authentication device 220 may determine whether the authentication code is a valid authentication code that has previously been provided to a third party device 240, that has previously been generated and/or stored by authentication device 220, that has not expired (e.g., a threshold amount of time has not elapsed since the authentication code was generated), that has not previously been used in associated with a different request for a third party service, etc.

If authentication device 220 determines that the authentication code is invalid, that mobile device 210 could not be authenticated, that a message from mobile device 210 could not be properly decrypted, that a digital signature from mobile device 210 could not be verified, that a digital signature received from mobile device 210 has been revoked, or the like, then authentication device 220 may provide an instruction, to third party device 240, to deny client device 230 access to the third party service. Based on the instruction, third party device 240 may provide, to client device 230, an indication that access has been denied. Additionally, or alternatively, authentication device 220 may not provide any information to third party device 240. In this case, third party device 240 may not permit access to the third party service.

As further shown in FIG. 9, process 900 may include determining a global user identifier associated with the mobile device (block 925). For example, authentication device 220 may determine a mobile device identifier (e.g., an MTN, an IMSI, a digital certificate, etc.) that identifies mobile device 210. In some implementations, mobile device 210 may provide the mobile device identifier to authentication device 220 along with the authentication code. Authentication device 220 may determine a global user identifier associated with the mobile device identifier. For example, authentication device 220 may search a data structure, using the mobile device identifier, to identity a global user identifier associated with the mobile device identifier. Authentication device 220 may store associated mobile device identifiers and global user identifiers during a registration process, as described herein in connection with FIG. 4.

As further shown in FIG. 9, process 900 may include determining a transaction identifier and a third party device identifier included in the authentication code (block 930), and providing the global user identifier and the transaction identifier to a third party device identified by the third party device identifier (block 935). For example, authentication device 220 may determine a transaction identifier and a third party device identifier based on the authentication code. In some implementations, the transaction identifier and/or the third party device identifier may be included in the authentication code, as described herein in connection with FIG. 7. Additionally, or alternatively, authentication device 220 may determine the transaction identifier and/or the third party device identifier based on decrypting the authentication code. In some implementations, where authentication device 220 does not store the third party device identifier, the third party device identifier may be received in a communication received from mobile device 210 (e.g., may be embedded in a deep link URL used to access the global authentication service).

Authentication device 220 may provide the global user identifier and the transaction identifier to a third party device 240 identified by the third party device identifier. In some implementations, authentication device 220 may encrypt the global user identifier and/or the transaction identifier using a salt and/or a hash to form encrypted information, and may provide the encrypted information to third party device 240. Authentication device 220 may use a different salt and/or hash for different third party devices 240 and/or third party service providers. For example, authentication device 220 may use a website identifier, a third party device identifier, a random number, etc., to salt and/or hash the global user identifier and/or the transaction identifier. In this way, the global user identifier stored by authentication device 220 may be different from each global user identifier stored by different third party devices 240 (e.g., for a particular user). Additionally, or alternatively, authentication device 220 may use a different salt and/or hash for different users (e.g., for each global user identifier).

Once authentication device 220 has provided the global user identifier and the transaction identifier to third party device 240, authentication device 220 may remove the authentication code and/or the transaction identifier from storage, and/or may mark the authentication code and/or the transaction identifier as invalid. In this way, authentication device 220 may ensure that an authentication code and/or a transaction identifier are only used for a single transaction.

As further shown in FIG. 9, process 900 may include receiving the global user identifier and the transaction identifier (block 940), determining a session identifier linked to the transaction identifier (block 945), and determining a local user profile linked to the global user identifier (block 950). For example, third party device 240 may receive the global user identifier and the transaction identifier from authentication device 220 (e.g., via network 250). Third party device 240 may determine a session identifier linked to the transaction identifier. For example, third party device 240 may search a data structure, using the transaction identifier, to identify a session identifier linked with the transaction identifier. Third party device 240 may link transaction identifiers and session identifiers when an authentication code is requested and received by third party device 240, as described herein in connection with FIG. 7.

Additionally, or alternatively, third party device 240 may determine a local user profile linked to the global user identifier. For example, third party device 240 may search a data structure, using the global user identifier, to identify a local user profile linked with the global user identifier. Third party device 240 may link global user identifiers and local user profiles when a user registers to use the global authentication service in connection with a third party service provider associated with third party device 240. A local user profile may include information used by a third party service provider in association with a particular user (e.g., a name, a profile, account information, account preferences, payment information, etc.). If third party device 240 cannot identify a local user profile associated with the global user identifier (e.g., because a user has not previously registered for the third party service or has not linked a global user identifier to a local user profile), then third party device 240 may provide information to client device 230 requesting a user to provide user registration information to register for the third party service or to link a global user identifier to a local user profile.

In some implementations, a single global user identifier may be associated with multiple local user profiles. For example, each local user profile may be associated with a different third party service provider (e.g., a different website, a different application, etc.) or a different service provided by a third party service provider, and a user may use a single global user identifier to access different third party services each linked to a different local user profile for the user. Additionally, or alternatively, a single local user profile may be associated with multiple global user identifiers. For example, two users in the same household may use different global user identifiers to access the same local user profile associated with a third party service (e.g., the same bank account jointly owned by the users, the same online shopping account, etc.).

As further shown in FIG. 9, process 900 may include permitting access, using the local user profile, to a third party service associated with the session identifier (block 955). For example, third party device 240 may permit client device 230, associated with the session identifier, to access a service provided by third party device 240. In some implementations, authentication device 220 and/or third party device 240 may generate a single sign-on (SSO) token to establish a session for providing access to the service. In this way, a properly authenticated user may be provided access to the third party service without inputting a username or password for each session.

Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

FIGS. 10A-10E are diagrams of an example implementation 1000 relating to example process 900 shown in FIG. 9. FIGS. 10A-10E show an example of using an authentication code to provide access to a third party service using a global authentication service. For the purpose of FIGS. 10A-10E, assume that the operations described herein in connection with FIGS. 5A-5D, 6A, 6B, and 8A-8C have been performed, and that client device 230 has received a QR code from third party device 240.

Figure 10A:
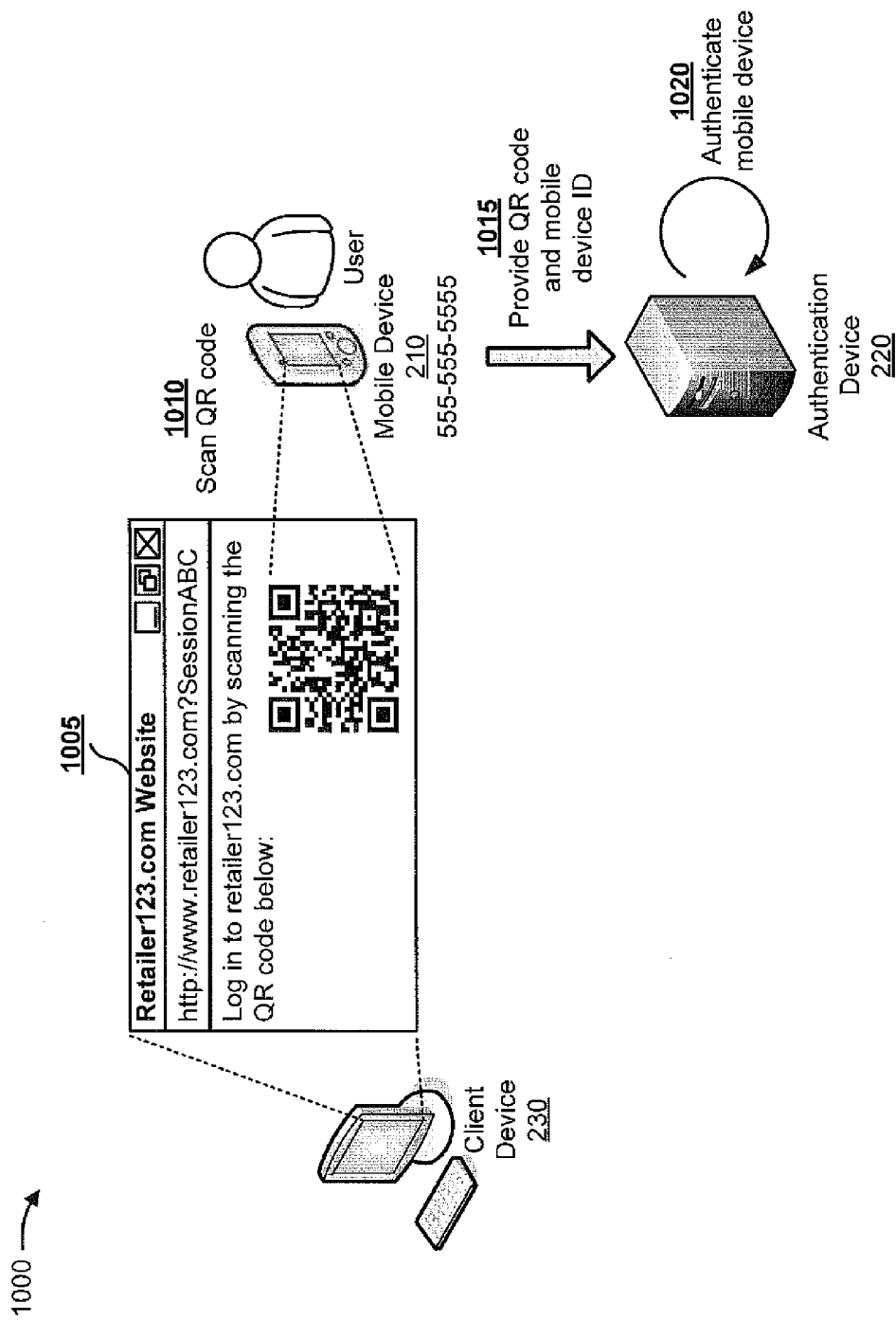
FIGS. 10A-10E are diagrams of an example implementation relating to the example process shown in FIG. 9.

As shown in FIG. 10A, and by reference number 1005, assume that client device 230 provides the QR code, received from third party device 240 (e.g., florida.retailer.com), for display. As shown by reference number 1010, assume that a user (e.g., UserA) uses a mobile device 210, identified by a mobile telephone number of 555-555-5555, to scan the QR code (e.g., using a QR code scanning application and/or a global authentication application). As shown by reference number 1015, assume that mobile device 210 provides the QR code to authentication device 220 (e.g., using a global authentication application). As shown by reference number 1020, assume that authentication device 220 authenticates mobile device 210. If the mobile device identifier (e.g., 555-555-5555) is not stored by authentication device 220, then authentication device 220 may request that the user provide registration information, via mobile device 210, to register for the global authentication service, as described in more detail elsewhere herein. Assume that authentication device 220 authenticates mobile device 210.

Figure 10B:
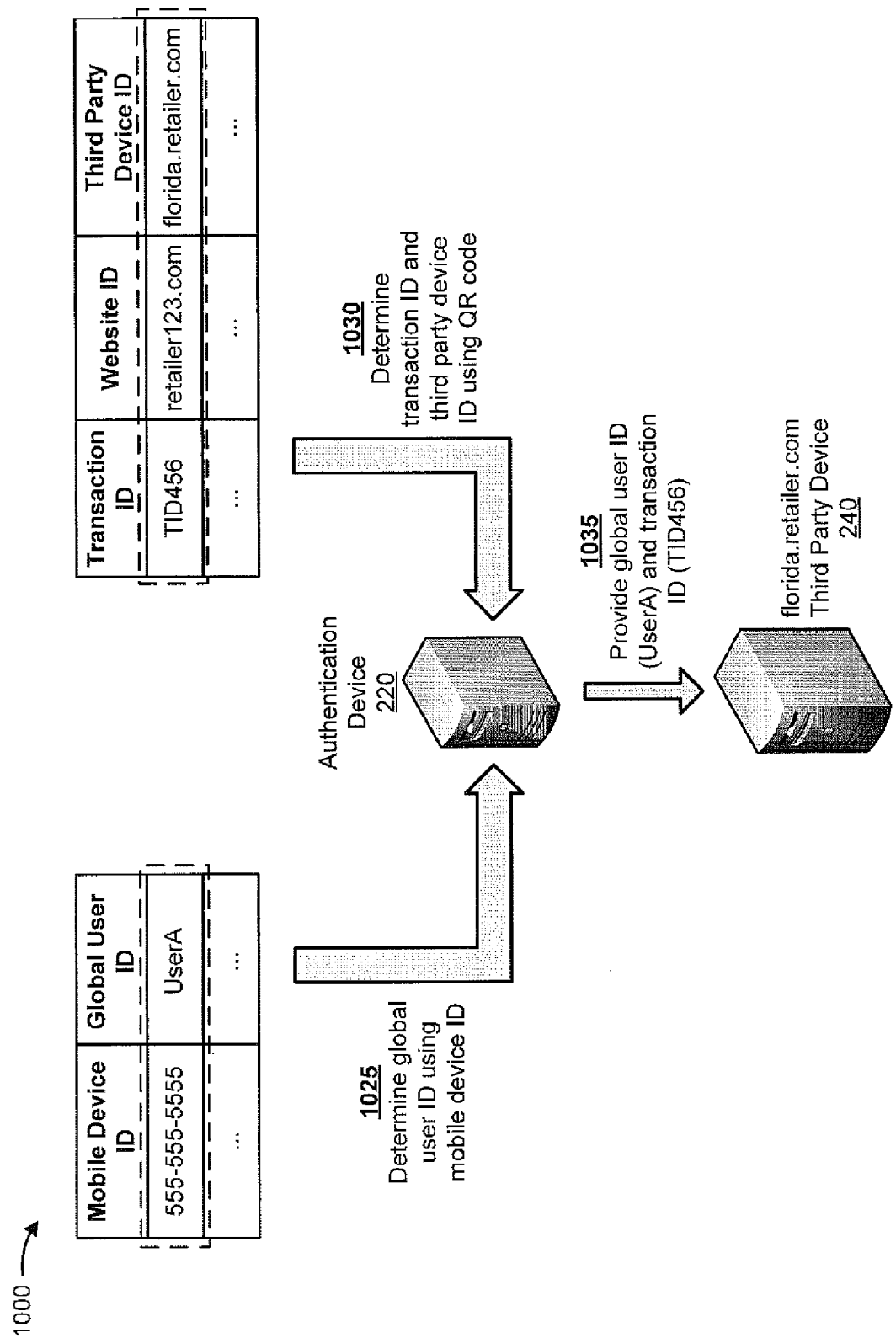

As shown in FIG. 10B, and by reference number 1025, assume that authentication device 220 determines a global user identifier using the mobile device identifier. For example, assume that authentication device 220 causes a data structure to be searched, using the mobile device identifier 555-555-5555, to identify a global user identifier, shown as UserA, that is linked with the mobile device identifier 555-555-5555.

As shown by reference number 1030, assume that authentication device 220 determines a transaction identifier and a third party device identifier using the QR code. For example, assume that authentication device 220 extracts the transaction identifier and the third party device identifier from the QR code (e.g., by decrypting the QR code). As shown by reference number 1035, assume that authentication device 220 provides the global user identifier (UserA) and the transaction identifier (TID456) to third party device 240 identified by the third party device identifier (florida.retailer.com).

Figure 10C:
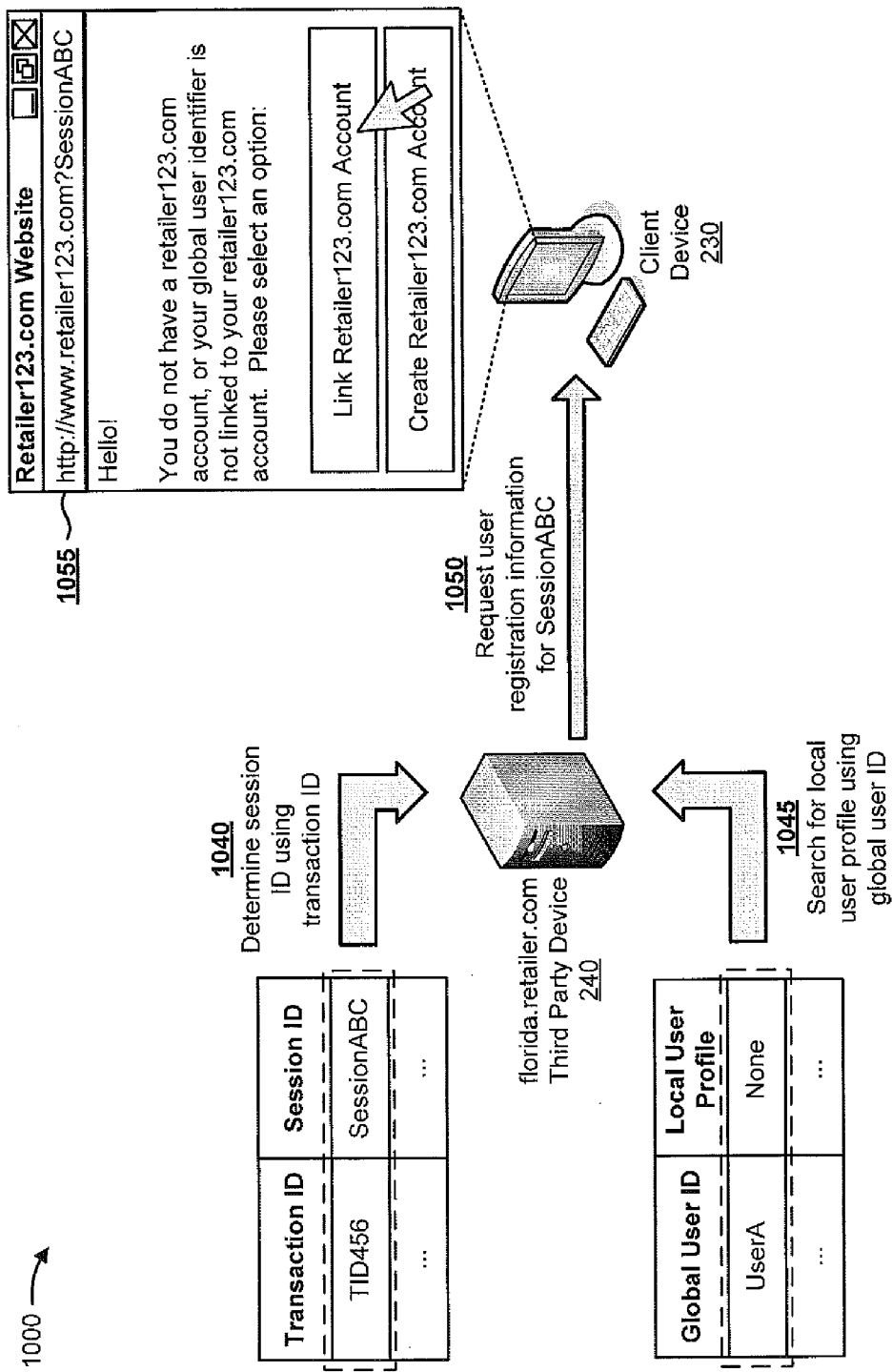

As shown in FIG. 10C, and by reference number 1040, assume that third party device 240 determines a session identifier using the transaction identifier. For example, assume that third party device 240 causes a data structure to be searched, using the transaction identifier TID456, to identify a session identifier, shown as SessionABC, that is linked with the transaction identifier TID456. As shown by reference number 1045, assume that third party device 240 searches for a local user profile using the global user identifier. For example, assume that third party device 240 causes a data structure to be searched, using the global user identifier UserA, to identify a local user profile.

For the purpose of FIG. 10C, assume that UserA has not yet linked a local user profile, associated with retailer123.com, to a global user identifier (UserA) associated with the global authentication service. In this case, and as shown by reference number 1050, assume that third party device 240 sends a request for user registration information to client device 230 associated with SessionABC. As shown by reference number 1055, assume that client device 230 provides two options for the user to provide the user registration information. For example, the user may provide the user registration information by creating a retailer123.com local user profile (e.g., if the user does not already have an account with retailer123.com), or the user may provide the user registration information by linking the user's global user identifier with a retailer123.com local user profile (e.g., if the user has already established an account with retailer123.com). Assume that the user selects to link an existing retailer123.com local user profile with the global user identifier.

Figure 10D:
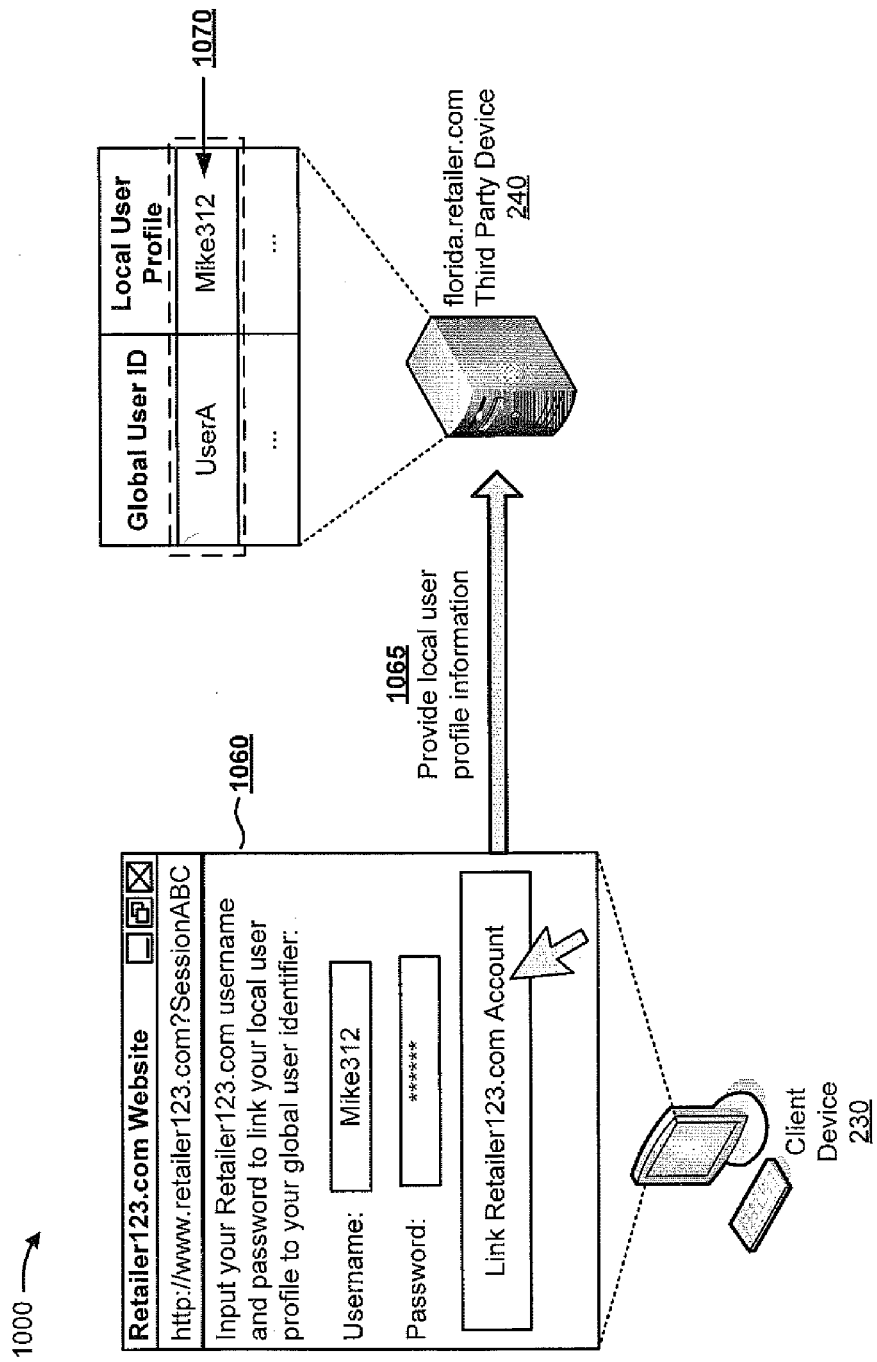

As shown in FIG. 10D, and by reference number 1060, assume that client device 230 provides (e.g., based on information received from third party device 240) input mechanisms for the user to link a retailer123.com local user profile with a global user identifier. For example, assume that the user inputs a username, shown as Mike312, and a password associated with the user's retailer123.com local user profile, and interacts with an input mechanism to link the user's local user profile and the user's global user identifier. As shown by reference number 1065, assume that client device 230 provides the local user profile information to third party device 240, causing third party device 240 to link the local user profile and the global user identifier. For example, as shown by reference number 1070, assume that third party device 240 stores an indication that a local user profile associated with the username Mike312 is associated with a global user identifier of UserA.

Figure 10E:
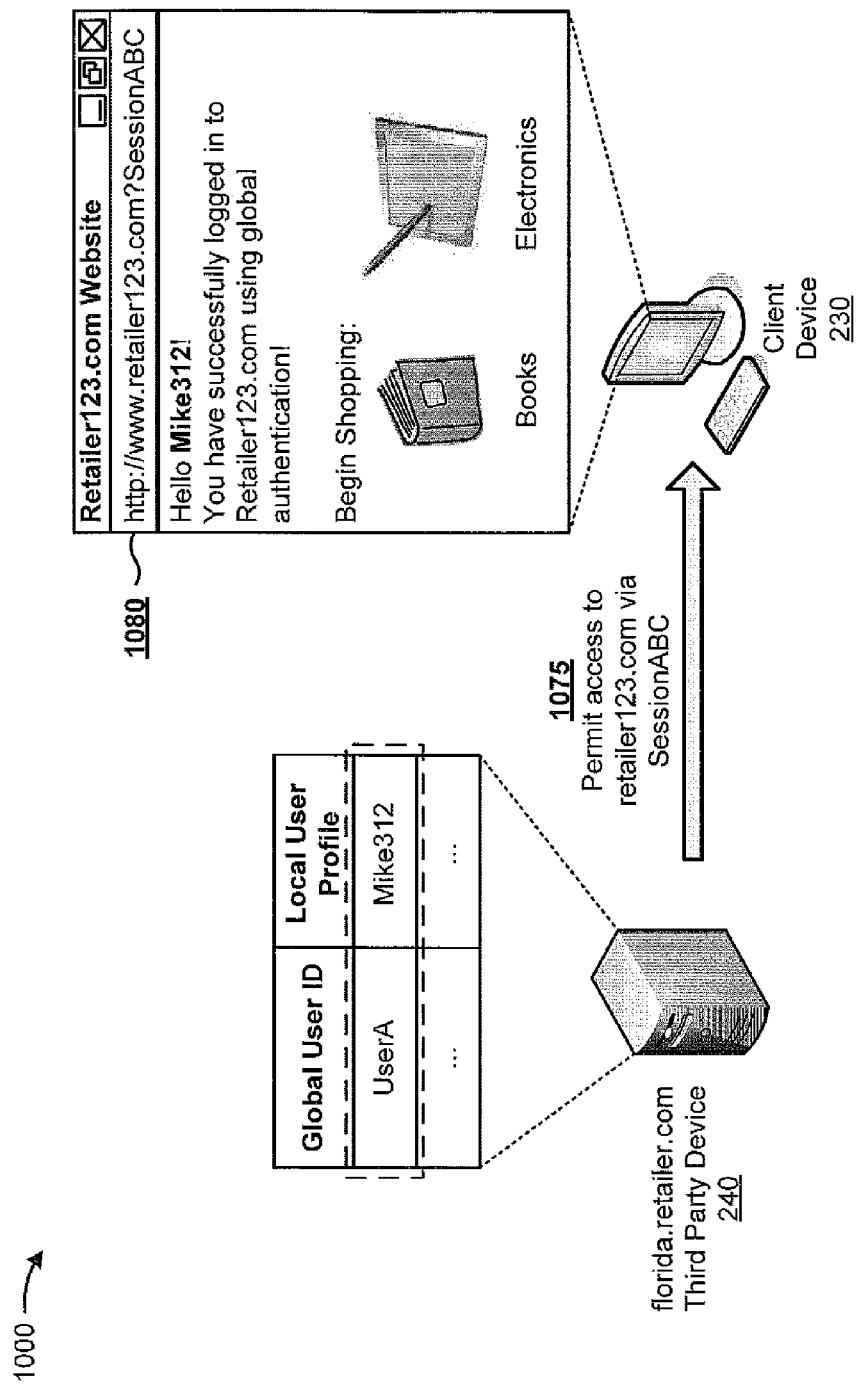

As shown in FIG. 10E, and by reference number 1075, assume that third party device 240 permits client device 230 to access retailer123.com via SessionABC (e.g., a session between client device 230 and florida.retailer.com third party device 240). As shown by reference number 1080, third party device 240 may permit access and/or may provide information based on a local user profile associated with the username Mike312. In this way, a user may use a global user identifier to access third party services from multiple third party service providers, without the need to use or remember multiple usernames and passwords.

As indicated above, FIGS. 10A-10E are provided merely as an example. Other examples are possible and may differ from what was described with regard to FIGS. 10A-10E.

Implementations described herein may reduce user reliance on usernames and passwords by providing a mechanism to authenticate a user using a global authentication service.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. In some implementations, the user interfaces may be customizable by a device and/or a user. Additionally, or alternatively, the user interfaces may be pre-configured to a standard configuration, a specific configuration based on a type of device on which the user interfaces are displayed, and/or a set of configurations based on capabilities and/or specifications associated with a device on which the user interfaces are displayed.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, as described herein, may be implemented in many different forms of software, firmware, and hardware in the implementations shown in the figures. The actual software code or specialized control hardware used to implement these systems and/or methods is not limiting of the implementations. Thus, the operation and behavior of the systems and/or methods were described herein without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An authentication device, comprising:
a memory to store instructions; and
one or more processors to execute the instructions to:
receive a request for a Quick Response (QR) code,
the QR code being associated with a request, by a client device, to access a third party service;
generate the QR code;
provide the QR code to a third party device based on the client device requesting access to the third party service,
the third party device providing the third party service to which the client device has requested access, and
the third party device providing the QR code to the client device;
receive, from a mobile device, the QR code,
the mobile device being different from the client device, and
the mobile device and the client device being associated with a user;
determine a third party device identifier included in the QR code,
the third party device identifier identifying the third party device that provides the third party service;
determine a mobile device identifier that identifies the mobile device;
search a data structure of the authentication device to identify a global user identifier associated with the mobile device identifier,
the global user identifier being associated with a plurality of local user profiles of the user,
each local user profile, of the plurality of local user profiles of the user, being associated with a particular third party service of a plurality of third party services;
determine a transaction identifier included in the QR code; and
selectively provide the transaction identifier and the global user identifier to the third party device, identified by the third party device identifier, to cause the third party device to selectively permit the client device to access the third party service,
the global user identifier being used to identify a local user profile in the third party device,
the local user profile being used to access the third party service,
the third party service being one of the plurality of third party services, and
the local user profile being one of the plurality of local user profiles of the user.

2. The authentication device of claim 1, where the one or more processors are further to:
determine that the QR code, received from the mobile device, is valid; and
where the one or more processors, when selectively providing the transaction identifier to the third party device, are to:
provide the transaction identifier to the third party device based on determining that the QR code is valid.

3. The authentication device of claim 1, where the one or more processors are further to:
determine that the QR code, received from the mobile device, is invalid; and
prevent the transaction identifier from being provided to the third party device based on determining that the QR code is invalid.

4. The authentication device of claim 1, where the one or more processors are further to:
provide an instruction, to the third party device, to deny access to the third party service by the client device based on determining that the QR code is invalid.

5. The authentication device of claim 3, where the one or more processors, when determining that the QR code is invalid, are to:
determine that the QR code is invalid based on at least one of:
determining that the QR code does not match a stored QR code;
determining that the QR code does not match a previously generated QR code;
determining that the QR code has not been provided to the third party device;

determining that a threshold amount of time has elapsed since the QR code was generated; or determining that the QR code has been used in QR with a different request for the third party service or another third party service.

6. The authentication device of claim 1, where the mobile device identifier is associated with a plurality of global user identifiers that include the global user identifier; and where the one or more processors are further to:
receive information identifying the user; and
determine the global user identifier based on the information identifying the user.

7. The authentication device of claim 1, where the one or more processors are further to:
determine that the global user identifier has been revoked; and
prevent the transaction identifier from being provided to the third party device based on determining that the global user identifier has been revoked.

8. The authentication device of claim 1, where the global user identifier is associated with a plurality of mobile devices.

9. A non-transitory computer-readable medium storing instructions, the instructions comprising:
one or more instructions that, when executed by one or more processors, cause the one or more processors to:
receive a request for a Quick Response (QR) code,
the QR code being associated with a request, by a client device, to access a third party service;
generate the QR code;
provide, based on the client device requesting access to the third party service, the QR code to a third party device that provides the third party service to which the client device has requested access,
the third party device providing the QR code to the client device;
receive, from a mobile device, the QR code,
the mobile device being different from the client device, and
the mobile device and the client device being associated with a user;
determine a third party device identifier identified by the QR code,
the third party device identifier identifying the third party device that provides the third party service;
determine a mobile device identifier that identifies the mobile device;
search a data structure to identify a global user identifier associated with the mobile device identifier,
the global user identifier being associated with a plurality of local user profiles of the user,
each local user profile, of the plurality of local user profiles of the user, being associated with a particular third party service of a plurality of third party services;
determine a transaction identifier identified by the QR code;
provide the transaction identifier and the global user identifier to the third party device identified by the third party device identifier,
the global user identifier being used to identify a local user profile in the third party device,
the local user profile being used to access the third party service,
the third party service being one of the plurality of third party services, and
the local user profile being one of the plurality of local user profiles of the user; and
cause the third party device to permit the client device to access the third party service based on providing the transaction identifier and the global user identifier to the third party device.

10. The non-transitory computer-readable medium of claim 9, where the one or more instructions, when executed by the one or more processors, further cause the one or more processors to:
provide, to the third party device, information to link the local user profile, associated with the third party service, to a plurality of global user identifiers that include the global user identifier.

11. The non-transitory computer-readable medium of claim 9, where the one or more instructions, when executed by the one or more processors, further cause the one or more processors to:
cause the third party device to determine a session identifier associated with the transaction identifier based on providing the transaction identifier to the third party device,
the session identifier identifying a communication session between the client device and the third party device; and
cause the third party device to identify the client device using the session identifier; and
where the one or more instructions, that cause the one or more processors to cause the third party device to permit the client device to access the third party service, cause the one or more processors to:
cause the third party device to permit the client device to access the third party service based on causing the third party device to identify the client device using the session identifier.

12. The non-transitory computer-readable medium of claim 9, where the one or more instructions, when executed by the one or more processors, further cause the one or more processors to:
provide the global user identifier to the third party device to:
cause the third party device to determine that the global user identifier is not linked to a local user profile, associated with the third party service, based on providing the global user identifier to the third party device, and
cause the third party device to request user registration information for linking a local user profile to the global user identifier based on causing the third party device to determine that the global user identifier is not linked to a local user profile.

13. The non-transitory computer-readable medium of claim 9, where the one or more instructions, that cause the one or more processors to receive, from the mobile device, the QR code, cause the one or more processors to:
receive the QR code via a camera of the mobile device.

14. The non-transitory computer-readable medium of claim 9, where the one or more instructions, when executed by the one or more processors, further cause the one or more processors to:
remove the QR code or the transaction identifier from storage based on providing the transaction identifier and the global user identifier to the third party device.

15. A method, comprising:
receiving, by an authentication device, a request for a Quick Response (QR) code, the QR code being associated with a request, by a client device, to access a third party service;

generating, by the authentication device, the QR code;

providing, by the authentication device and based on the client device requesting access to the third party service, the QR code to a third party device that provides the third party service requested by the client device, the third party device providing the QR code to the client device;

receiving, by the authentication device and from a mobile device that is different from the client device, the QR code,
   the mobile device and the client device being associated with a user;

determining, by the authentication device and based on the QR code, a third party device identifier,
   the third party device identifier identifying the third party device that provides the third party service;

determining, by the authentication device, a mobile device identifier that identifies the mobile device;

searching, by the authentication device, a data structure of the authentication device to identify a global user identifier associated with the mobile device identifier,
   the global user identifier being associated with a plurality of local user profiles of the user,
      each local user profile, of the plurality of local user profiles of the user, being associated with a particular third party service of a plurality of third party services;

determining, by the authentication device and based on the QR code, a transaction identifier;

providing, by the authentication device, the transaction identifier and the global user identifier to the third party device identified by the third party device identifier,
   the global user identifier being used to identify a local user profile in the third party device,
      the local user profile being used to access the third party service,
         the third party service being one of the plurality of third party services, and
      the local user profile being one of the plurality of local user profiles of the user; and causing, by the authentication device, the third party device to permit the client device to access the third party service based on providing the transaction identifier and the global user identifier to the third party device.

16. The method of claim 15, where generating the QR code comprises:

generating the QR code by including the third party device identifier and the transaction identifier in the QR code;

where determining the third party device identifier comprises:
   determining the third party device identifier by extracting the third party device identifier from the QR code; and where determining the transaction identifier comprises:
   determining the transaction identifier by extracting the transaction identifier from the QR code.

17. The method of claim 15, further comprising:

causing the third party device to link the transaction identifier and a session identifier, that identifies a communication session between the third party device and the client device, based on providing the QR code to the third party device;

causing the third party device to identify the session identifier, using the transaction identifier, based on providing the transaction identifier to the third party device; and causing the third party device to identify the client device using the session identifier; and where causing the third party device to permit the client device to access the third party service comprises:
   causing the third party device to permit the client device, identified using the session identifier, to access the third party service.

18. The method of claim 15, where the QR code is obtained by the mobile device from a display associated with the client device.

19. The method of claim 15, where the local user profile is associated with a plurality of global user identifiers.

20. The method of claim 15, further comprising:

receiving a revocation request;

revoking the global user identifier based on receiving the revocation request; and deleting information stored in the data structure based on revoking the global user identifier.

* * * * *